(12) United States Patent
Yamamoto et al.

(10) Patent No.: US 10,746,106 B2
(45) Date of Patent: Aug. 18, 2020

(54) FUEL CONTROL DEVICE AND CONTROL METHOD FOR A COMBUSTOR OF A GAS TURBINE

(71) Applicant: Mitsubishi Hitachi Power Systems, Ltd., Kanagawa (JP)

(72) Inventors: Keisuke Yamamoto, Tokyo (JP); Takashi Sonoda, Tokyo (JP); Ryuji Takenaka, Yokohama (JP); Hikaru Katano, Yokohama (JP); Eiki Anzawa, Yokohama (JP); Sosuke Nakamura, Yokohama (JP); Fuminori Fujii, Yokohama (JP); Shinichi Yoshioka, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 228 days.

(21) Appl. No.: 15/750,750

(22) PCT Filed: Jun. 16, 2016

(86) PCT No.: PCT/JP2016/067974
§ 371 (c)(1),
(2) Date: Feb. 6, 2018

(87) PCT Pub. No.: WO2017/033541
PCT Pub. Date: Mar. 2, 2017

(65) Prior Publication Data
US 2018/0223743 A1 Aug. 9, 2018

(30) Foreign Application Priority Data
Aug. 25, 2015 (JP) .................... 2015-166179

(51) Int. Cl.
*F02C 9/54* (2006.01)
*F02C 9/34* (2006.01)
(Continued)

(52) U.S. Cl.
CPC ................ *F02C 9/54* (2013.01); *F01D 17/16* (2013.01); *F02C 7/042* (2013.01); *F02C 7/228* (2013.01);
(Continued)

(58) Field of Classification Search
CPC ........ F02C 9/50; F02C 9/54; F02C 9/48; F02C 7/042; F02C 9/20; F02C 9/28; F02C 9/00;
(Continued)

(56) References Cited

U.S. PATENT DOCUMENTS 7,058,556 B2 * 6/2006 Desai ..................... G05B 17/02
700/31
7,610,745 B2 11/2009 Fujii et al.
(Continued)

FOREIGN PATENT DOCUMENTS

| JP | 6-10711 | 1/1994 |
|---|---|---|
| JP | 2001-193480 | 7/2001 |

(Continued)

OTHER PUBLICATIONS

International Search Report dated Sep. 20, 2016 in International (PCT) Application No. PCT/JP2016/067974, with English translation.
(Continued)

Primary Examiner — Scott J Walthour
Assistant Examiner — Todd N Jordan
(74) Attorney, Agent, or Firm — Wenderoth, Lind & Ponack, L.L.P.

(57) ABSTRACT

An IGV opening command value is corrected to calculate an actual opening equivalent value that indicates an approximate value of an actual opening. A temperature estimation value, for a case where a mixture of fuel and in-flowing air is combusted, is calculated using the actual opening equiva- (Continued)

lent value, atmospheric conditions, and an output from a gas turbine. A fuel distribution command value that indicates distribution of fuel output from a plurality of fuel supply systems is calculated on the basis of the temperature estimation value. The fuel distribution command value and a fuel control signal command value that indicates the total flow rate of fuel to be output to the plurality of fuel supply systems are acquired, and respective valve openings of fuel flow rate regulating valves of the fuel supply systems are calculated on the basis of the fuel distribution command value and the fuel control signal command value.

12 Claims, 22 Drawing Sheets

(51) Int. Cl.

| | | |
|---|---|---|
| *F02C 9/16* | (2006.01) | |
| *F02C 9/00* | (2006.01) | |
| *F02C 7/24* | (2006.01) | |
| *F02C 7/228* | (2006.01) | |
| *F02C 9/20* | (2006.01) | |
| *F02C 9/28* | (2006.01) | |
| *F02C 7/042* | (2006.01) | |
| *F02C 9/50* | (2006.01) | |
| *F01D 17/16* | (2006.01) | |

(52) U.S. Cl.
CPC ............... *F02C 7/24* (2013.01); *F02C 9/00* (2013.01); *F02C 9/16* (2013.01); *F02C 9/20* (2013.01); *F02C 9/28* (2013.01); *F02C 9/34* (2013.01); *F02C 9/50* (2013.01); *F05D 2220/32* (2013.01); *F05D 2270/05* (2013.01); *F05D 2270/303* (2013.01); *F05D 2270/44* (2013.01)

(58) Field of Classification Search
CPC ..... F02C 9/26; F02C 9/263; F02C 7/22; F01D 17/16
See application file for complete search history.

(56) References Cited

U.S. PATENT DOCUMENTS

| | | | |
|---|---|---|---|
| 7,707,814 B2* | 5/2010 | Sonoda ................ | F02C 9/28 60/243 |
| 8,800,296 B2* | 8/2014 | Kishi ................... | F02C 9/28 60/39.281 |
| 8,896,250 B2* | 11/2014 | Brahmavar .......... | H02H 3/38 318/255 |
| 9,176,488 B2* | 11/2015 | Moore ................. | F01D 17/162 |
| 9,732,676 B2* | 8/2017 | Saito ................... | F02C 7/22 |
| 10,107,495 B2* | 10/2018 | Minto .................. | F23N 5/18 |
| 2004/0064297 A1* | 4/2004 | Alvarez ............... | G05B 13/04 703/2 |
| 2007/0079593 A1 | 4/2007 | Fujii et al. | |
| 2016/0326967 A1* | 11/2016 | Yamamoto ........... | F02C 9/28 |
| 2017/0211409 A1* | 7/2017 | Saito ................... | F01D 17/16 |
| 2018/0223743 A1* | 8/2018 | Yamamoto ........... | F02C 9/16 |

FOREIGN PATENT DOCUMENTS

| | | |
|---|---|---|
| JP | 2007-77867 | 3/2007 |
| JP | 2008-75578 | 4/2008 |
| JP | 4119909 | 7/2008 |
| JP | 2009-19528 | 1/2009 |
| JP | 2012-92681 | 5/2012 |

OTHER PUBLICATIONS

Written Opinion of the International Searching Authority dated Sep. 20, 2016 in International (PCT) Application No. PCT/JP2016/067974, with English translation.

* cited by examiner

FUEL CONTROL DEVICE AND CONTROL METHOD FOR A COMBUSTOR OF A GAS TURBINE

TECHNICAL FIELD

The present invention relates to a fuel control device, a combustor, a gas turbine, a control method, and a program.

This application claims priority based on JP 2015-166179 filed in Japan on Aug. 25, 2015, of which the contents are incorporated herein by reference.

BACKGROUND ART

In relation to a supply of fuel to a gas turbine combustor, the fuel is sometimes supplied while being distributed into a plurality of systems, from the point of view of efficiency and stability of combustion. In such a case, the distribution of the fuel to each of the systems needs to be taken into account.

FIG. 21 is a diagram illustrating an example of fuel distribution control of a conventional gas turbine. As illustrated in FIG. 21, a conventional fuel control device estimates a temperature of combustion gas at a turbine inlet, on the basis of atmospheric pressure, atmospheric temperature, an inlet guide vane (IGV) opening designated value, and a gas turbine output value. The fuel control device calculates a ratio of the fuel to be allocated to each of the systems on the basis of the estimated turbine inlet temperature. The fuel control device determines a fuel supply amount to nozzles of each of the fuel systems on the basis of the distribution ratio to each of the systems, and a total fuel flow rate that is based on a fuel control signal command value (CSO). The fuel control device controls valve openings of fuel flow rate regulating valves provided in each of the systems, on the basis of that fuel supply amount.

Further, in the gas turbine combustor, when the distribution ratio of the fuel supplied from the plurality of systems is changed, for example, combustion oscillation is known to occur. The combustion oscillation is a pressure fluctuation inside the combustor, which causes damage to the combustor and gas turbine components. There is therefore a need to suppress the combustion oscillation (see Patent Document 1).

FIG. 22 is a diagram illustrating an example of relationships between fuel distribution ratios to fuel systems and a turbine inlet temperature at the time of a load change with conventional technology. As illustrated in the figure, depending on values of the fuel distribution ratios and the turbine inlet temperature, regions exist in which the combustion oscillation occurs (see reference sign 74 and reference sign 75). The reference sign 71 illustrates a target operation line representing a relationship between the fuel distribution ratio and the turbine inlet temperature at which this type of combustion oscillation does not occur. In the fuel control device, it is desirable to control the distribution ratio of the fuel supplied to each of the systems so as to obtain the fuel distribution ratio that can avoid the region in which the combustion oscillation occurs, as illustrated by the target operation line 71.

CITATION LIST

Patent Literature

Patent Document 1: JP 2012-92681 A

SUMMARY OF INVENTION

Technical Problems

However, when a gas turbine output fluctuates, the inlet temperature of the turbine also changes accordingly. Then, particularly when the fluctuation is rapid or the like, the estimation value of the turbine inlet temperature calculated as described above does not keep pace with the changes in the actual turbine inlet temperature. As a result, an operation line that illustrates a relationship between the fuel distribution ratios calculated by the fuel control device on the basis of the estimation value of the turbine inlet temperature, and the actual gas turbine inlet temperature may be included in the region in which the combustion oscillation occurs. For example, FIG. 22 illustrates an example of an operation line (see reference sign 72) when a load is increased. Further, FIG. 22 illustrates an example of an operation line (see reference sign 73) when the load is decreased. Both of these operation lines are included in the region in which the combustion oscillation occurs (the reference sign 74 or the reference sign 75), there is a possibility of combustion oscillation occurring, and this becomes a problem.

An object of the present invention is to provide a fuel control device, a combustor, a gas turbine, a control method, and a program that can solve the above-described issues.

Solution to Problem

According to a first aspect of the present invention, a fuel control device may be provided with an IGV response correction unit, a combustion temperature estimation value calculation unit, a fuel distribution command value calculation unit and a valve opening calculation unit. The IGV response correction unit may correct an opening command value of an inlet guide vane, which controls an amount of air caused to be mixed and combust with fuel, and calculate an actual opening equivalent value that indicates an approximate value of an actual opening, when an opening-closing operation of the inlet guide vane is performed on the basis of the opening command value. The combustion temperature estimation value calculation unit may calculate a temperature estimation value when a mixture of the fuel and in-flowing air is combusted, using the actual opening equivalent value, atmospheric conditions, and a gas turbine output. The fuel distribution command value calculation unit may calculate and output, on the basis of the temperature estimation value, a fuel distribution command value that indicates a distribution of the fuel output from a plurality of fuel supply systems. The valve opening calculation unit may acquire the fuel distribution control signal and a fuel control signal command value that indicates a total fuel flow rate to be output to the plurality of fuel supply systems, and calculate respective valve openings of fuel flow rate regulating valves of the plurality of fuel supply systems on the basis of the fuel distribution command value and the fuel control signal command value.

In the above-described fuel control device, the IGV response correction unit may calculate the actual opening equivalent value on the basis of a correlation that is prescribed in advance between the opening command value of the inlet guide vane that controls the amount of the air caused to be mixed and combust with the fuel and the actual opening of the inlet guide vane.

The above-described fuel control device may be provided with a gas turbine output prediction value calculation unit that calculates a gas turbine output prediction value on the basis of a correlation that is prescribed in advance between the fuel control signal command value and a correction amount of the gas turbine output, and the acquired fuel control signal command value.

The above-described fuel control device may be provided with a gas turbine output correction amount calculation unit and a gas turbine output prediction value calculation unit. The gas turbine output correction amount calculation unit may calculate a gas turbine output correction amount that corrects the output prediction value, on the basis of a correlation that is prescribed in advance between the fuel control signal command value and a value that corrects the gas turbine output, and the acquired fuel control signal command value. The gas turbine output prediction value calculation unit may calculate the output prediction value, using an actual measured value of the gas turbine output, and the gas turbine output correction amount.

The above-described fuel control device may be provided with a coefficient calculation unit. The coefficient calculation unit may calculate a weighting coefficient corresponding to the gas turbine output correction amount, in accordance with a value indicating changes in the gas turbine output per unit time. The gas turbine output prediction value calculation unit may calculate the output prediction value using the actual measured value of the gas turbine output, and a value obtained by multiplying the gas turbine output correction amount by the weighting coefficient.

The above-described fuel control device may be provided with a load change rate determination unit that detects the changes in the gas turbine output per unit time, and sets the gas turbine output correction value to zero when the changes in the gas turbine output are smaller than a predetermined value.

The above-described fuel control device may be provided with a coefficient calculation unit that calculates a weighting coefficient corresponding to the gas turbine output correction amount, in accordance with a value indicating the gas turbine output.

The above-described fuel control device may be provided with a switching unit. The switching unit may switch the weighting coefficient relating to the corresponding gas turbine output correction, on the basis of weighting coefficients corresponding to at least two or more gas turbine load change modes prescribed in advance in accordance with load changes of a gas turbine per unit time and to at least two or more gas turbine output corrections, prescribed in advance and corresponding to each of the gas turbine load change modes, and on the basis of the gas turbine load change mode. The gas turbine output prediction value calculation unit may calculate the output prediction value using the actual measured value of the gas turbine output and a value obtained by multiplying the gas output correction amount by the weighting coefficient.

Further, according to a second aspect of the present invention, a combustor may be provided with the above-described fuel control device.

Further, according to a third aspect of the present invention, a gas turbine may be provided with the above-described fuel control device.

In addition, according to a fourth aspect of the present invention, a fuel control method may correct an opening command value of an inlet guide vane, which controls an amount of air caused to be mixed and combust with fuel, and calculate an actual opening equivalent value that indicates an approximate value of an actual opening, when an opening-closing operation of the inlet guide vane is performed on the basis of the opening command value. The control method may calculate a temperature estimation value when a mixture of the fuel and in-flowing air is combusted, using the actual opening equivalent value, atmospheric conditions, and a gas turbine output. The control method may calculate and output, on the basis of the temperature estimation value, a fuel distribution command value that indicates a distribution of the fuel output from a plurality of fuel supply systems. The control method may acquire the fuel distribution control signal and a fuel control signal command value that indicates a total fuel flow rate to be output to the plurality of fuel supply systems, and calculate respective valve openings of fuel flow rate regulating valves of the plurality of fuel supply systems on the basis of the fuel distribution command value and the fuel control signal command value.

According to a fifth aspect of the present invention, a program may cause a computer of a fuel control device to function as IGV response correction means, combustion temperature estimation value calculation means, fuel distribution command value calculation means, and valve opening calculation means. The IGV response correction means may correct an opening command value of an inlet guide vane, which controls an amount of air caused to be mixed and combust with fuel, and calculate an actual opening equivalent value that indicates an approximate value of an actual opening, when an opening-closing operation of the inlet guide vane is performed on the basis of the opening command value. The combustion temperature estimation value calculation means may calculate a temperature estimation value when a mixture of the fuel and in-flowing air is combusted, using the actual opening equivalent value, atmospheric conditions, and a gas turbine output. The fuel distribution command value calculation means may calculate and output, on the basis of the temperature estimation value, a fuel distribution command value that indicates a distribution of the fuel output from a plurality of fuel supply systems. The valve opening calculation means may acquire the fuel distribution control signal and a fuel control signal command value that indicates a total, fuel flow rate to be output to the plurality of fuel supply systems, and calculate respective valve openings of fuel flow rate regulating valves of the plurality of fuel supply systems on the basis of the fuel distribution command value and the fuel control signal command value.

Advantageous Effects of Invention

According to the above-described fuel control device, combustor, gas turbine, control method, and program, discrepancies can be suppressed between actual fuel system fuel ratios and target fuel system fuel ratios with respect to the turbine inlet temperature even during a transition period of a load change. In this way, the above-described fuel control device, combustor, gas turbine, control method, and program can avoid occurrence of combustion oscillation.

DESCRIPTION OF EMBODIMENTS

First Embodiment

The following is a description of a fuel control device according to a first embodiment of the present invention, with reference to FIGS. 1 to 6.

Figure 1:
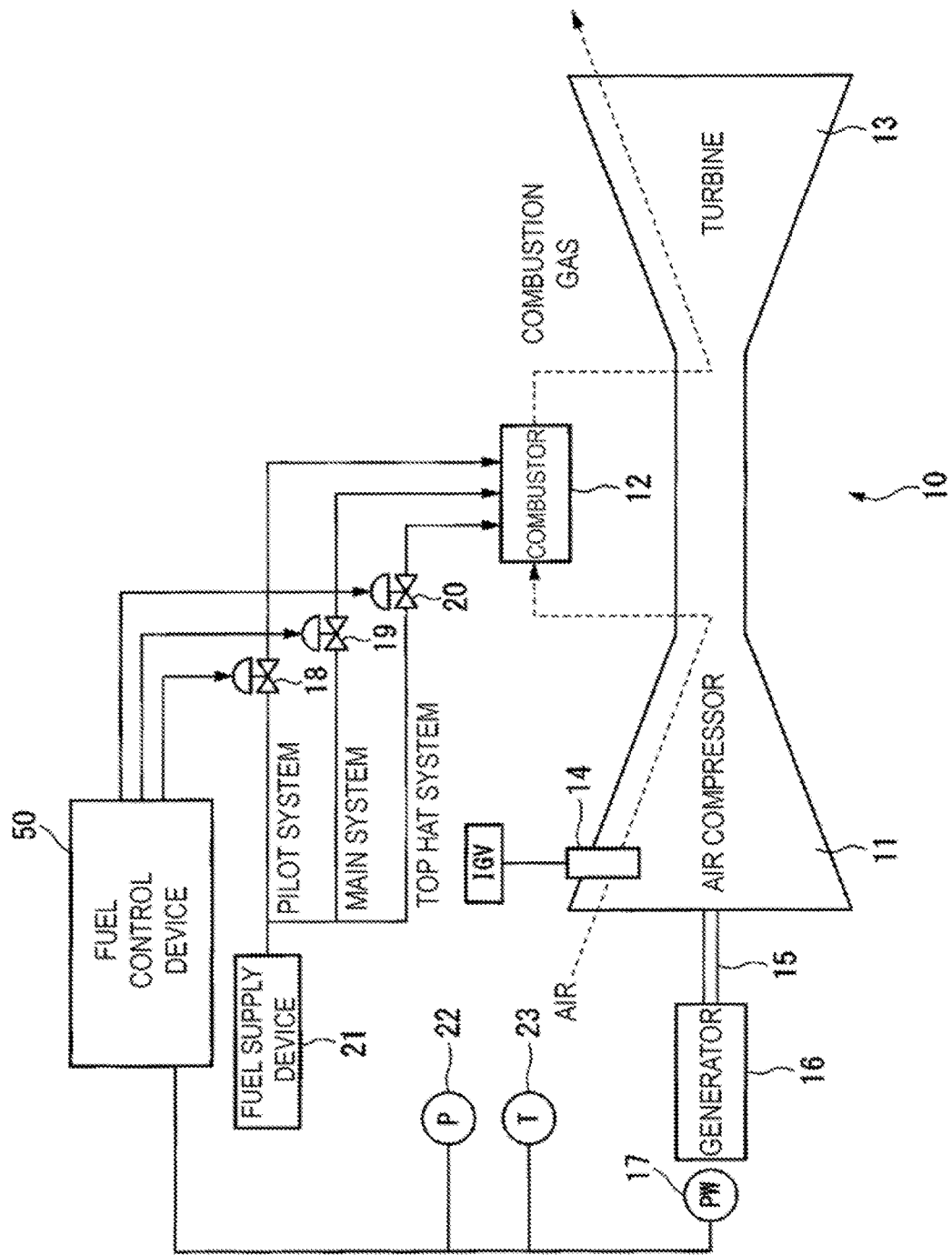
FIG. 1 is a system diagram illustrating a gas-turbine plant of a first embodiment according to the present invention.

FIG. 1 is a system diagram illustrating a gas turbine plant according to the present embodiment.

As illustrated in FIG. 1, the gas turbine plant according to the present embodiment includes a gas turbine 10, a generator 16 that generates electricity by being driven by the gas turbine 10, and a fuel control device 50 that controls operations of the gas turbine 10. The gas turbine 10 and the generator 16 are connected by a rotor 15.

The gas turbine 10 includes an air compressor 11 that compresses air to generate compressed air, a combustor 12 that mixes and combusts the compressed air and fuel gas to generate high temperature combustion gas, and a turbine 13 that is driven by the combustion gas.

Figure 2:
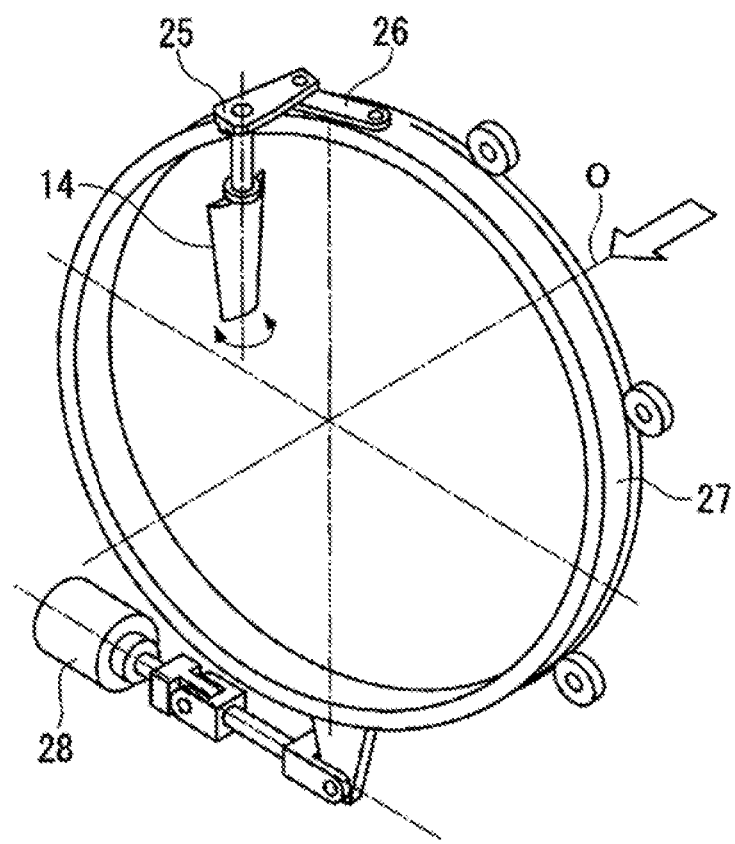
FIG. 2 is a perspective view illustrating an annular member of an IGV of the first embodiment according to the present invention.

The air compressor 11 is provided with an IGV 14 and an inflow amount of air to the air compressor 11 is controlled by adjusting an IGV opening. More specifically, taking a rotating shaft of a rotor that configures the air compressor 11 as a center, the air compressor 11 has a compressor casing that covers the rotor such that the rotor can rotate, and the IGV 14, which is provided in a suction port of the compressor casing. A round annular member 27 is provided in the compressor casing, and a plurality of drivers are attached to the annular member 27. The drivers are configured by a link mechanism 26, an arm 25, and the IGV 14 that are illustrated in FIG. 2. As illustrated in FIG. 2, one end of the link mechanism 26 is rotatably attached to the annular member 27. Further, the arm 25 is rotatably attached to a tip portion of the other end of the link mechanism 26. Each of a plurality of the IGVs 14 is connected to the annular member 27 via the arm 25 and the link mechanism 26. The gas turbine plant is further provided with an IGV control device (not illustrated), which causes the annular member 27 to rotate around a rotation axis O of the rotor 15. When the annular member 27 rotates around the rotation axis of the rotor, the link mechanism 26 and the arm 25 rotate at a section at which they are mutually connected, and as a result, an orientation of a vane of the IGV 14, which configures a vane structure, changes. The IGV control device (not illustrated) can collectively control the movement of all the IGVs without individually controlling the IGVs 14. A pressure gage 22, and a thermometer 23 are provided on the inlet side of the air compressor 11. The pressure gage 22 measures atmospheric pressure and outputs the measurement result to the fuel control device 50. The thermometer 23 measures atmospheric temperature and outputs the measurement result to the fuel control device 50.

The combustor 12 is connected to a fuel supply device 21 that supplies fuel to the combustor 12. The fuel is supplied to the combustor 12 from a plurality of fuel supply systems (a pilot system, a main system, and a top hat system). Thus, valves that adjust a flow rate of each of the fuel systems are provided between the fuel supply device 21 and the combustor 12, namely, a pilot system fuel flow rate regulating valve (hereinafter referred to as a first adjustment valve) 18, a main system fuel flow rate regulating valve (hereinafter referred to as a second adjustment valve) 19, and a top hat system fuel flow rate regulating valve (hereinafter referred to as a third adjustment valve) 20.

The generator 16 is provided with a power meter 17, which measures the power generated by the generator 16 and outputs the measurement result to the fuel control device 50.

The fuel control device 50 determines a distribution ratio for allocating the fuel to each of the fuel systems, and adjusts a valve opening of each of the fuel flow rate regulating valves provided in each of the fuel supply systems. In other words, the fuel control device 50 adjusts the first adjustment valve 18, the second adjustment valve 19, and the third adjustment valve 20, and controls the fuel flow rate flowing into the combustor 12 from nozzles of each of the systems.

Figure 3:
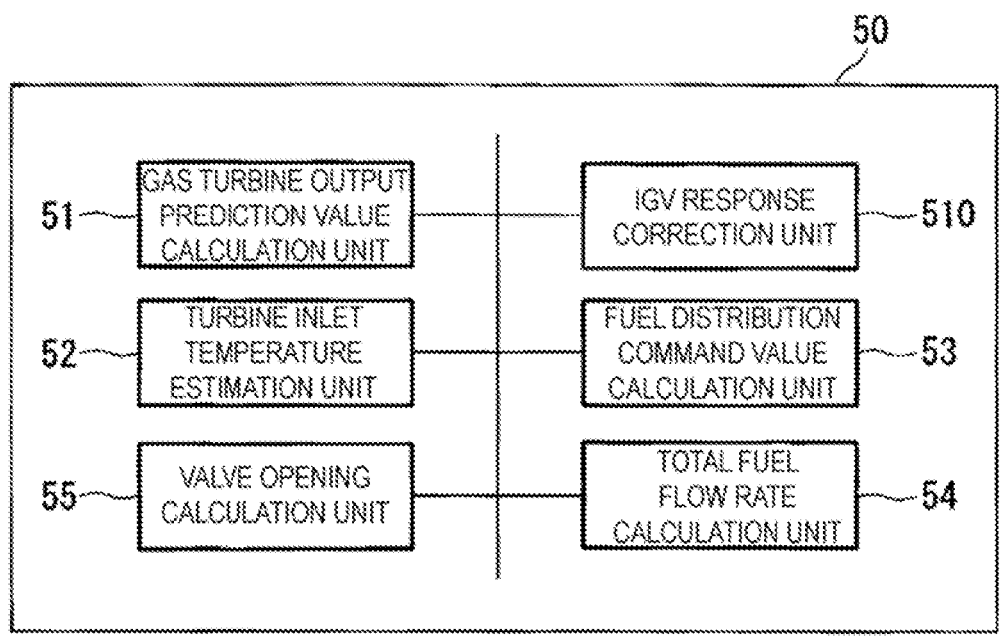
FIG. 3 is a block diagram illustrating an example of a fuel control device of the first embodiment according to the present invention.

FIG. 3 is a block diagram illustrating an example of the fuel control device of the first embodiment according to the present invention.

A gas turbine output prediction value calculation unit 51 acquires, from a gas turbine output control unit (not illustrated) that controls output of the gas turbine, a fuel control signal command value (CSO: Control Signal Output). The gas turbine output prediction value calculation unit 51 calculates an output prediction value (MW) of the gas turbine on the basis of the CSO. The fuel control signal command value (CSO) is a control output signal that controls the fuel flow rate supplied to the combustor. The calculation of the gas turbine output prediction value is performed in the following manner, for example. A table in which the CSO and the gas turbine output prediction values are associated with each other, and/or mathematical functions are stored in a storage unit (not illustrated) provided in the fuel control device 50. The gas turbine output prediction value calculation unit 51 reads the table on the basis of the acquired CSO, and acquires the gas turbine output prediction value. Alternatively, when an output prediction value corresponding to a desired CSO is not present in the table, the gas turbine output prediction value calculation unit 51 uses a read-out gas turbine output prediction value and performs interpolation, thus calculating the gas turbine output prediction value. A correlation between the CSO and the gas turbine output prediction value is prescribed in advance by performing simulations, experiments and the like. Further, the storage unit may be a storage device that is connected to the fuel control device 50.

An IGV response correction unit 510 calculates an IGV actual opening equivalent value. More specifically, the IGV response correction unit 510 acquires an IGV opening command value from the IGV control device (not illustrated), and by correcting that value, estimates the IGV actual opening equivalent value. In relation to the opening of the IGV 14, due to factors and the like described below, a response delay, a misalignment in the opening or the like occur until the opening indicated by the IGV opening command value is obtained. Such factors include mechanical delay occurring as a result of deformation or play in an actuator 28, the arm 25, or the link mechanism 26, or control-based delay caused by the time required for filter processing to eliminate noise from a signal and the like. A table or the like is prepared in advance that prescribes response delay occurring from a given IGV opening until a predetermined IGV opening is obtained. The IGV response correction unit 510 uses this table, for example, to correct the IGV opening command value and calculate the IGV actual opening equivalent value. The IGV actual opening equivalent amount may be calculated by substituting, into an operational expression, the IGV opening command value acquired by the IGV response correction unit 510, the mechanical delay occurring as a result of deformation or play in the actuator 28, the arm 25, or the link mechanism 26, and information (parameters) relating to the time required for the filter processing to eliminate the noise from a signal. In other words, the IGV response correction unit 510 corrects the IGV opening command value that controls the amount of air caused to be mixed and combusted with the fuel, and calculates the actual opening equivalent value that indicates an approximate value to the actual opening when the opening of the IGV is operated on the basis of the opening command value.

A turbine inlet temperature estimation unit 52 estimates the temperature of the combustion gas at the inlet of the turbine. More specifically, the turbine inlet temperature estimation unit 52 acquires the atmospheric pressure from the pressure gage 22, the atmospheric temperature from the thermometer 23, the IGV actual opening equivalent value from the IGV response correction unit 510, and the gas turbine output prediction value from the gas turbine output prediction value calculation unit 51. On the basis of these values, the turbine inlet temperature estimation unit 52 estimates the temperature of the combustion gas at the inlet of the turbine (a turbine inlet temperature estimation value). A method for estimating the turbine inlet temperature is disclosed in JP 2007-77867 A, for example. To give an overview description, a table prescribing a relationship between the gas turbine output and the turbine inlet temperature at each IGV opening, a table prescribing a relationship between the atmospheric temperature and the gas turbine output at each IGV opening, and the like are prepared in advance. The turbine inlet temperature estimation unit 52 uses these tables and calculates the relationships of the turbine inlet temperature from the IGV opening, the atmospheric temperature, and the gas turbine output. The turbine inlet temperature estimation unit 52 further calculates the relationship between the gas turbine output and the gas turbine inlet temperature while taking into account an atmospheric pressure ratio, using a predetermined method. The turbine inlet temperature estimation unit 52 uses the correlation and estimates the turbine inlet temperature corresponding to the gas turbine output at a predetermined IGV opening that takes atmospheric conditions into account.

On the basis of the turbine inlet temperature estimation value estimated by the turbine inlet temperature estimation unit 52, a fuel distribution command value calculation unit 53 reads out a distribution ratio to the pilot nozzle, from a table stored in the storage unit in which the turbine inlet temperature estimation value and a distribution ratio of the fuel supplied to the pilot nozzle are associated with each other, for example, and/or mathematical functions. Similarly, the fuel distribution command value calculation unit 53 reads out a distribution ratio to the top hat nozzle, from a table in which the turbine inlet temperature estimation value and a distribution ratio of the fuel supplied to the top hat nozzle are associated with each other, and/or mathematical functions. Then, when the distribution ratios are represented as percentages, the fuel distribution command value calculation unit 53 subtracts a sum of the distribution ratios to the pilot nozzle and to the top hat nozzle from 100%, and thus calculates the distribution ratio of the fuel supplied to the main nozzle as the remaining percentage. When the fuel distribution command value calculation unit 53 calculates the distribution ratios to each of the fuel systems, those distribution ratios (fuel distribution command values) are output to a valve opening calculation unit 55. Note that when the fuel distribution command value calculation unit 53 cannot read out the distribution ratio of the fuel for a target turbine inlet temperature estimation value, from the table or the like that prescribes the turbine inlet temperature estimation value and the distribution ratio of each of the fuels, the distribution ratios may be calculated by interpolation calculation.

A total fuel flow rate calculation unit 54 acquires the CSO from the gas turbine output control unit, and calculates a total fuel flow rate represented by that CSO. The total fuel flow rate indicates the total fuel flow rate supplied to the combustor, and is a total of the fuels distributed to each of the systems. The calculation of the total fuel flow rate is performed on the basis of a table stored in the storage unit in which the CSO and the total fuel flow rate values are associated with each other, and/or mathematical functions. The total fuel flow rate calculation unit 54 outputs information of the total fuel flow rate to the valve opening calculation unit 55.

On the basis of the fuel distribution command value and the total fuel flow rate, the valve opening calculation unit 55 calculates the valve opening of the flow rate adjustment valves provided in each of the fuel systems. Specifically, the valve opening calculation unit 55 multiplies the total fuel flow rate with the distribution ratio to each of the systems, and calculates the fuel flow rate to each of the systems. Then, the valve opening calculation unit 55 uses the table in which the fuel flow rate and the valve opening command values have been associated with each other for each of the flow rate adjustment valves, and/or mathematical functions, and calculates the valve opening for the respective flow rate adjustment valves. Then, on the basis of the calculated valve degrees of opening, the valve opening calculation unit 55 controls the first adjustment valve 18, the second adjustment valve 19, and the third adjustment valve 20. Note that the table in which the fuel flow rates and the valve opening command values are associated with each other and/or the mathematical functions are stored in the storage unit.

Figure 4:
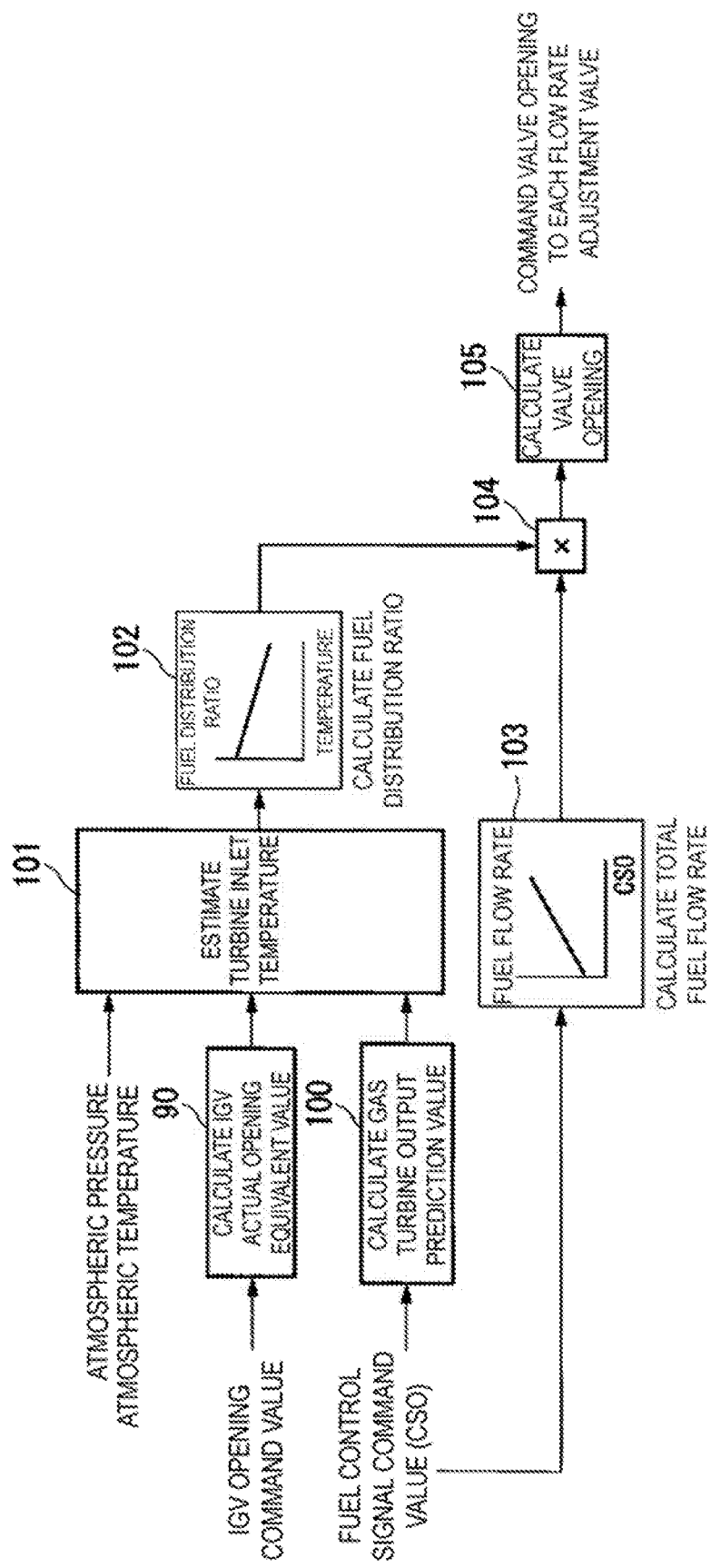
FIG. 4 is a diagram illustrating an example of fuel distribution control of the first embodiment according to the present invention.

FIG. 4 is a diagram illustrating an example of the fuel distribution control of the first embodiment according to the present invention.

The fuel distribution control of the present embodiment is described using FIG. 4.

First, the gas turbine output prediction value calculation unit 51 acquires the CSO from the gas turbine output control unit. The gas turbine output prediction value calculation unit 51 uses the acquired CSO and refers to the correspondence table of the CSO and the gas turbine output prediction values that is stored in advance, and calculates the gas turbine output prediction value (reference sign 100).

Next, the IGV response correction unit 510 acquires the IGV opening command value. The IGV response correction unit 510 calculates the IGV actual opening equivalent value (reference sign 90) by using the acquired IGV opening command value and referring to the correspondence table relating to the response delay of the IGV opening that is stored in advance, or by using the above-described operational expression.

Next, the turbine inlet temperature estimation unit 52 acquires the atmospheric pressure from the pressure gage 22, and the atmospheric temperature from the thermometer 23. Further, the turbine inlet temperature estimation unit 52 acquires the IGV actual opening equivalent value from the IGV response correction unit 510. In addition, the turbine inlet temperature estimation unit 52 acquires the gas turbine output prediction value from the gas turbine output prediction value calculation unit 51. Then, the turbine inlet temperature estimation unit 52 uses these parameters and the above-described table, or substitutes these parameters into an operational expression, and estimates the turbine inlet temperature (reference sign 101).

Next, on the basis of the turbine inlet temperature, the fuel distribution command value calculation unit 53 calculates the distribution ratios of the fuel supplied to each of the fuel supply systems (reference sign 102). The fuel distribution command value calculation unit 53 outputs the information of the distribution ratios to the valve opening calculation unit 55.

Meanwhile, the total fuel flow rate calculation unit 54 acquires the CSO from the gas turbine output control unit, and calculates the total fuel flow rate (reference sign 103). The total fuel flow rate calculation unit 54 outputs the information of the total fuel flow rate to the valve opening calculation unit 55.

The valve opening calculation unit 55 multiplies the distribution ratio for each of the fuel systems by the total fuel flow rate, and calculates the fuel flow rate supplied to each of the fuel systems (reference sign 104). The valve opening calculation unit 55 calculates the valve opening of the flow rate adjustment valves of each of the systems, from the fuel flow rate to each of the systems (reference sign 105). Then, the valve opening calculation unit 55 performs control on the basis of the valve opening command values by which each of the flow rate adjustment valves is calculated.

Figure 5:
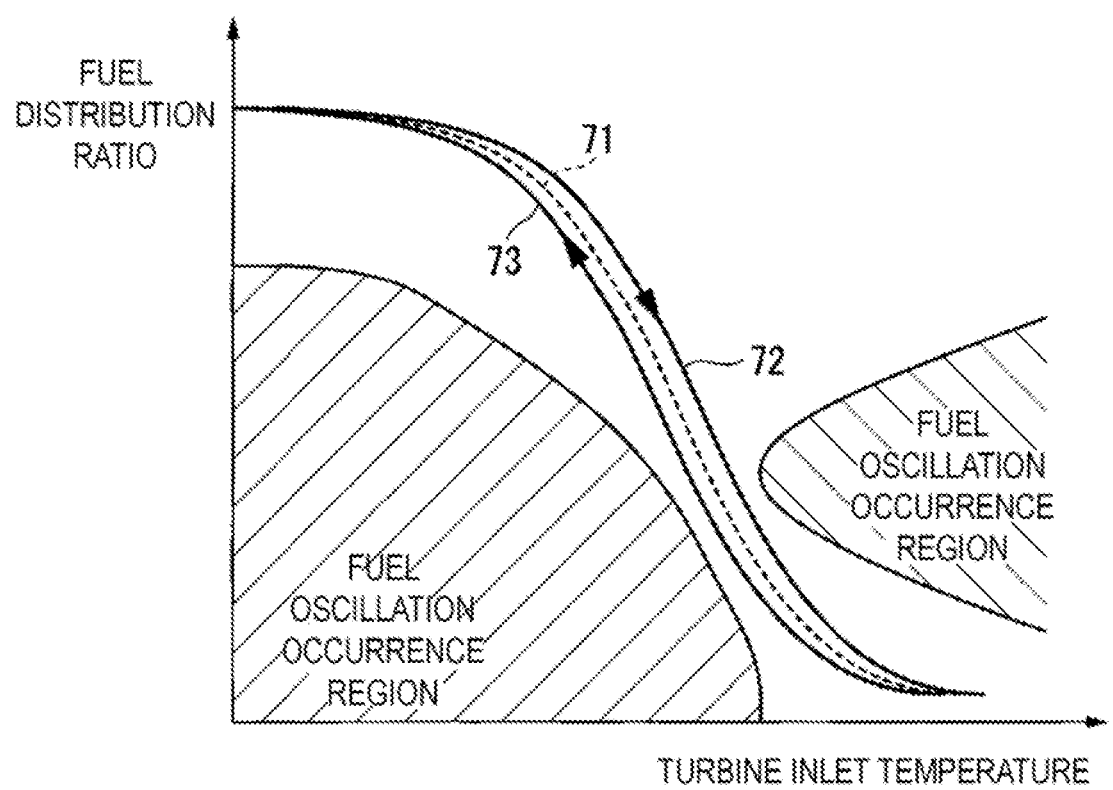
FIG. 5 is a diagram illustrating an example of results when the fuel distribution control is applied, in the first embodiment according to the present invention.

FIG. 5 is a diagram illustrating an example of results when the fuel distribution control is applied, in the first embodiment according to the present invention.

Figure 22:
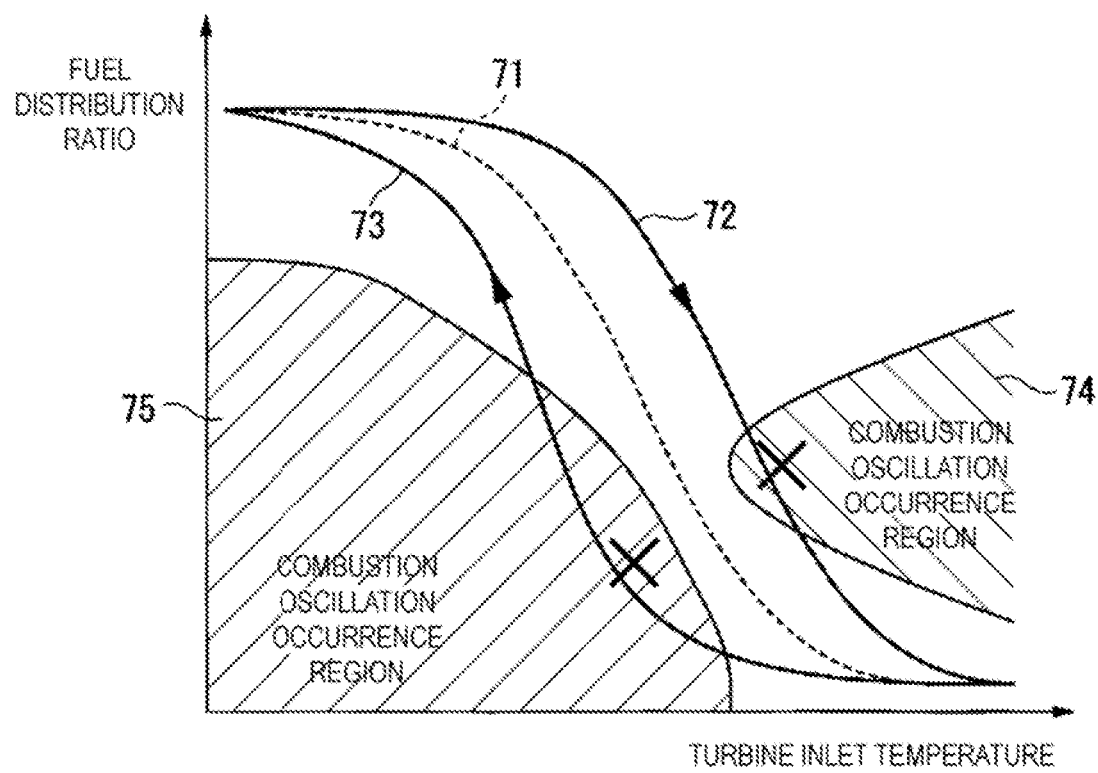
FIG. 22 is a diagram illustrating an example of a relationship between a fuel distribution ratio and a turbine inlet temperature at a time of load change in conventional technology.

As illustrated in FIG. 5, if the load increases or decreases when the fuel distribution control according to the present embodiment is applied, in contrast to the conventional results described using FIG. 22, in the case of both the operation line 72 when the load is increased, and the operation line 73 when the load is decreased, there is no section that is included in the combustion oscillation occurrence region.

In the conventional method, the turbine inlet temperature estimation value is determined depending on the actual gas turbine output and on the IGV opening command value on which the correction calculation has not been performed. In this case, as a result of the conventional fuel control device determining the fuel distribution ratios on the basis of the turbine inlet temperature estimation value, and performing control of the fuel supply to each of the systems in actuality, delay occurs due to various factors until the gas turbine output reaches a desired value. The various factors include, for example, mechanical delay (valve operation delay, pressure response delay, combustion delay), or control-based delay due to the time required for filter processing to eliminate noise from a signal and the like. Therefore, according to the conventional method, when the load fluctuations are severe, since the fuel distribution ratios are determined on the basis of the turbine inlet temperature estimation value that corresponds to the actual gas turbine output, when the valve opening is controlled in actuality on the basis of the determined distribution ratios, the gas turbine output value has already changed, and a situation occurs in which the control based on the previously calculated valve opening does not keep up with the actual conditions.

Further, conventionally, the IGV opening command is not corrected, and thus, a discrepancy occurs between the opening actually indicated by the IGV opening command, and the actual opening of the IGV, and a discrepancy occurs between the turbine inlet temperature estimation value calculated by the fuel control device 50 and the actual value of the turbine inlet temperature. Further, a timing at which the calculated turbine inlet temperature estimation value approaches the actual value is delayed.

However, according to the present embodiment, by calculating the turbine inlet temperature estimation value using the IGV actual opening equivalent value that is based on the IGV command value and the gas turbine predicted output that is based on the CSO, problems that are likely to occur in the conventional method, such as the time delay of the turbine inlet temperature estimation value caused as a result of calculating the turbine inlet temperature estimation value by performing feedback of the actual gas turbine output value, and the discrepancy with the actual turbine inlet temperature, can be compensated for in advance. In this way, even during a transition period of load changes, a discrepancy between the operation line and the target operation line can be reduced and the occurrence of combustion oscillation can be avoided.

In the above-described example of the fuel distribution control, the gas turbine output prediction value calculation unit 51 uses the acquired CSO (fuel control signal command value) and refers to the correspondence table of the CSOs and the gas turbine output prediction values that is stored in advance, to calculate the gas turbine output prediction value. Then, the turbine inlet temperature estimation unit 52 uses the gas turbine output prediction value, the IGV opening equivalent value, and the like to calculate the turbine inlet temperature estimation value. However, the turbine inlet temperature estimation unit 52 may input the CSO that has not been corrected by the gas turbine output prediction value calculation unit 51, as it is, and may calculate the turbine inlet temperature estimation value using the CSO, the IGV opening equivalent value, the atmospheric pressure, and the atmospheric temperature. By using the IGV opening equivalent value that is the corrected IGV opening command value, the discrepancy with the actual turbine inlet temperature can be compensated for in advance in comparison to the conventional technology, and even during the transition period of load changes, the discrepancy between the operation line and the target operation line can be reduced, and the occurrence of the combustion oscillation can be avoided.

Figure 6:
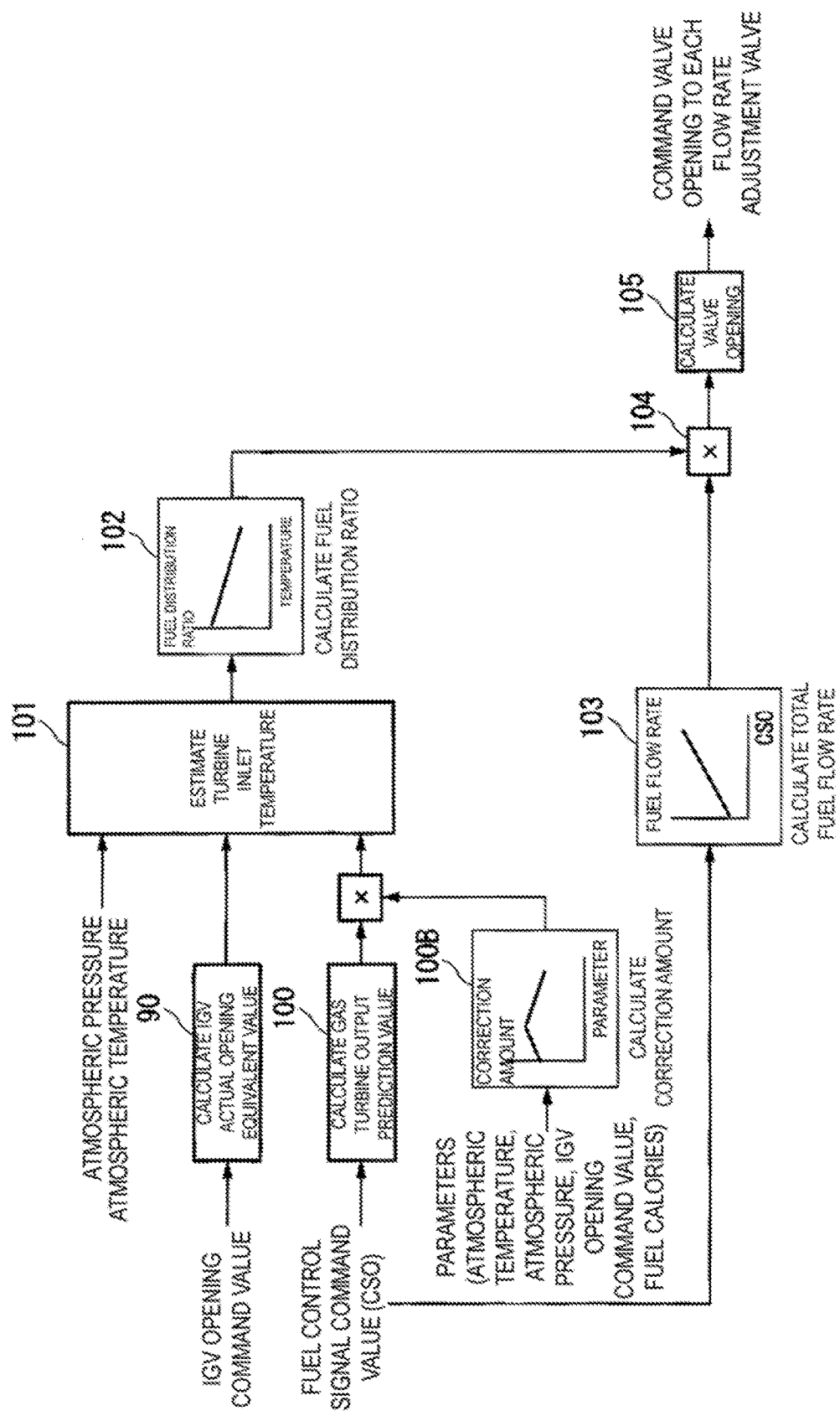
FIG. 6 is a diagram illustrating a modified example of the fuel distribution control of the first embodiment according to the present invention.

FIG. 6 is a diagram illustrating a modified example of the fuel distribution control of the first embodiment according to the present invention.

In this modified example, parameters other than the CSO are used in the calculation of the gas turbine output prediction value. Specifically, at least one of the following parameters is used: the atmospheric temperature; the atmospheric pressure; the IGV opening command value; and fuel calorie. Other processes are the same as those of the first embodiment.

The gas turbine output prediction value calculation unit 51 calculates the gas turbine output prediction value on the basis of the CSO (reference sign 100). Further, the gas turbine output prediction value calculation unit 51 acquires at least one of the above-described parameters. With respect to each of the parameters, the gas turbine output prediction value calculation unit 51 acquires the atmospheric pressure from the pressure gage 22, the atmospheric temperature from the thermometer 23, the IGV actual opening equivalent value from the IGV response correction unit 510, and the fuel calorie from a calorimeter (not illustrated) provided in the fuel system. The gas turbine output prediction value calculation unit 51 uses the acquired parameter, reads out, from the storage unit, a table prepared in advance for each of the parameters in which the values of each of the parameters and the gas turbine output prediction values are associated with each other, and calculates a correction amount on the basis of the table (reference sign 100B).

Alternatively, the gas turbine output prediction value calculation unit 51 may calculate a representative parameter on the basis of the acquired single or plurality of parameters, and then calculate the correction amount using the representative parameter and the information of the above-described table. Alternatively, the gas turbine output prediction value calculation unit 51 may substitute the acquired single or plurality of parameters into an operational expression and thus calculate the correction amount. The gas turbine output prediction value calculation unit 51 calculates the gas turbine output prediction value after correction, by multiplying the gas turbine output prediction value calculated on the basis of the CSO by the correction amount (or by adding the correction amount thereto).

According to this modified example, in addition to the effects of the first embodiment, the fuel ratios can be calculated on the basis of the gas turbine output prediction value that accords with the actual atmospheric temperature, atmospheric pressure, IGV opening command value, and fuel calorie, and thus, the control of the fuel flow rate that more accurately reflects the actual environment is possible, and the risk of combustion fluctuations can be further suppressed. Note that these parameters can be used in combination with each other.

Second Embodiment

Figure 7:
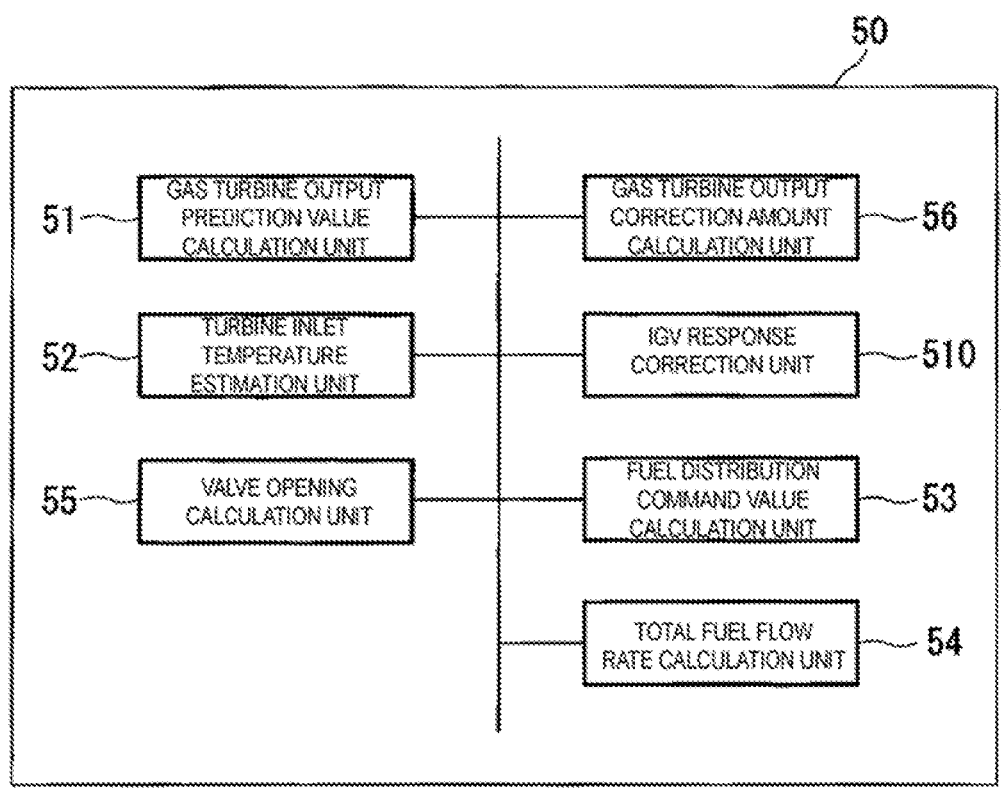
FIG. 7 is a block diagram illustrating an example of the fuel control device of a second embodiment according to the present invention.
Figure 8:
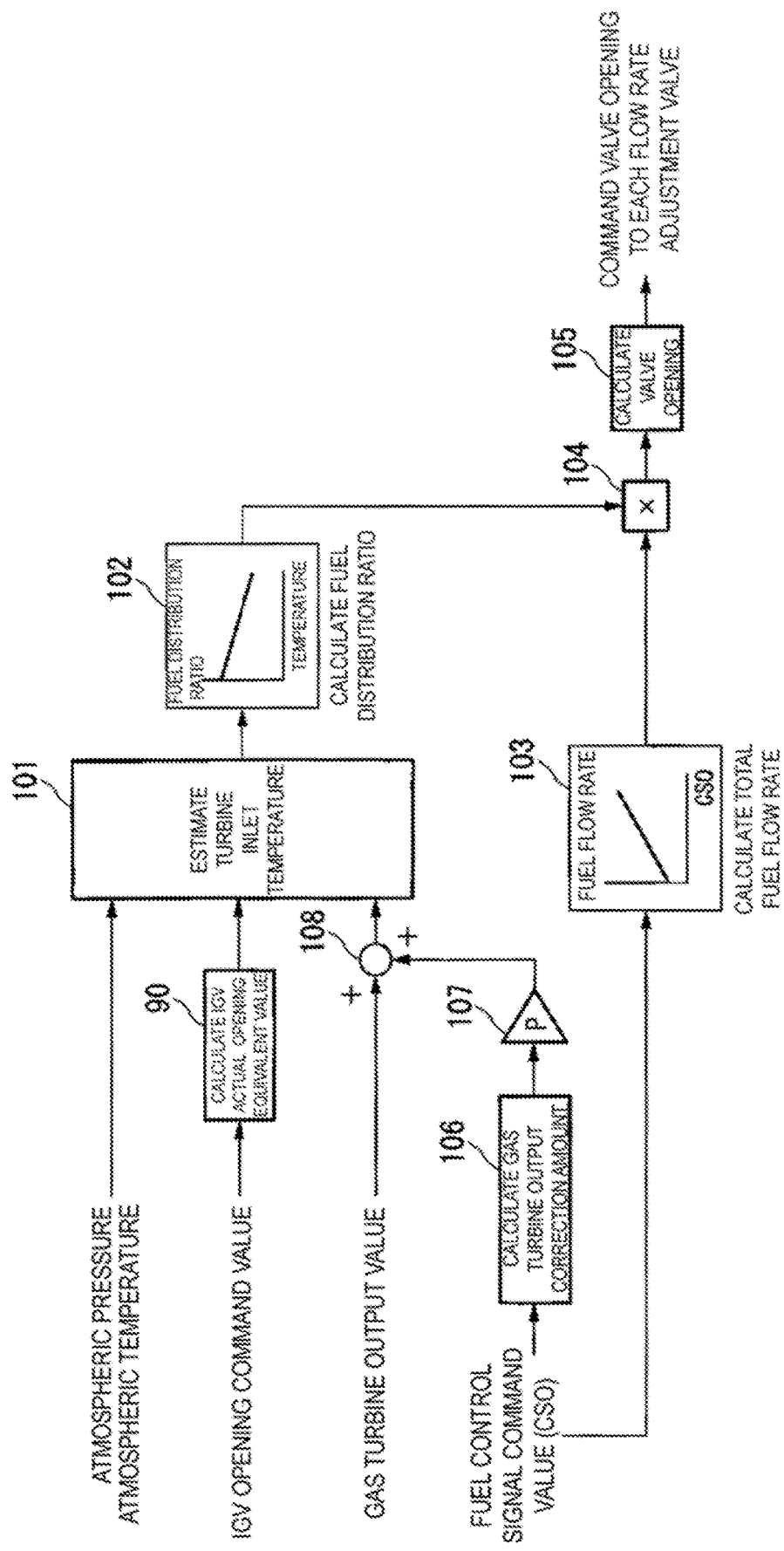
FIG. 8 is a diagram illustrating an example of the fuel distribution control of the second embodiment according to the present invention.

The following is a description of the fuel control device according to a second embodiment of the present invention, with reference to FIGS. 7 and 8.

FIG. 7 is a block diagram illustrating an example of the fuel control device of the present embodiment.

As illustrated in FIG. 7, the fuel control device 50 of the present embodiment is further provided with a gas turbine output correction amount calculation unit 56. Further, the method of calculating the gas turbine output prediction value by the gas turbine output prediction value calculation unit 51 is different to that of the first embodiment. The rest of the configuration of the present embodiment is the same as that of the first embodiment.

The gas turbine output correction amount calculation unit 56 acquires the CSO from the gas turbine output control unit, and calculates a correction amount of the gas turbine output on the basis of that CSO. In the calculation of the gas turbine output correction amount, a table in which the CSO and the gas turbine output correction amounts are associated with each other, and/or mathematical functions including a differentiator are stored in advance in the storage unit. The gas turbine output prediction value calculation unit 56 uses the acquired CSO and reads out the relevant table, and calculates the gas turbine output correction amount.

Next, the gas turbine output correction amount calculation unit 56 reads out, from the storage unit, a weighting coefficient P that has been prescribed in advance, and multiplies the gas turbine output correction amount acquired from the gas turbine output correction amount calculation unit 56 by the weighting coefficient P. Then, the gas turbine output correction amount calculation unit 56 outputs, to the gas turbine output prediction value calculation unit 51, the correction amount multiplied by the weighting coefficient P.

The gas turbine output prediction value calculation unit 51 acquires an output value (the gas turbine output value) of the generator 16 measured by the power meter 17. Then, the gas turbine output prediction value calculation unit 51 calculates the gas turbine output prediction value, from this gas turbine output value, and the gas turbine output correction amount acquired from the gas turbine output correction amount calculation unit 56.

FIG. 8 is a diagram illustrating an example of the fuel distribution control of the second embodiment according to the present invention.

The fuel distribution control of the present embodiment is described using FIG. 8.

First, the gas turbine output correction amount calculation unit 56 acquires the CSO from the gas turbine output control unit. The gas turbine output correction amount calculation unit 56 uses the acquired CSO and refers to the correspondence table of the CSOs and the gas turbine output correction amounts that is stored in advance, or uses an operational expression to calculate the gas turbine output correction amount (reference sign 106). Alternatively, when an output correction amount corresponding to a desired CSO is not present in the table, the gas turbine output correction amount calculation unit 56 may calculate the output correction amount by interpolation calculation.

Next, the gas turbine output prediction value calculation unit 51 reads out, from the storage unit, the coefficient P that has been prescribed in advance, and multiplies the gas turbine output correction amount acquired from the gas turbine output correction amount calculation unit 56 by the weighting coefficient P (reference sign 107). Then, the gas turbine output correction amount calculation unit 56 outputs, to the gas turbine output prediction value calculation unit 51, the correction amount multiplied by the weighting coefficient P.

Further, the gas turbine output prediction value calculation unit 51 acquires the gas turbine output value from the power meter 17. The gas turbine output prediction value calculation unit 51 adds the gas turbine output value to the correction amount acquired from the gas turbine output correction amount calculation unit 56, and thus calculates the gas turbine output prediction value (reference sign 108). Since the subsequent processes are the same as those of the first embodiment, a description thereof is omitted.

According to the present embodiment, the turbine inlet temperature is estimated using the gas turbine output prediction value corrected on the basis of the CSO, based on an actual measured value of the gas turbine output. Then, the distribution ratios of the fuel to each of the fuel systems are determined using this turbine inlet temperature. In this way, the distribution ratio control that is more in line with actual conditions can be performed, and the risk of the occurrence of combustion oscillation can be further reduced.

"More in line with actual conditions" includes, for example, a case in which the correlation between the CSO and the gas turbine output prediction value has changed from a time of design, due to aging degradation or the like. In the present embodiment, since the actual gas turbine output value that incorporates the aging degradation or the like is used, the accuracy of the gas turbine output prediction value is improved.

Further, also in the second embodiment, by estimating the turbine inlet temperature using the IGV opening equivalent value that is the corrected IGV opening command value, the discrepancy with the actual turbine inlet temperature can be compensated for in advance more rapidly than in the conventional technology, without measuring the actual opening. In this way, according to the control of the fuel control device of the second embodiment, even during a transition period of load changes, the discrepancy between the operation line and the target operation line can be reduced and the occurrence of combustion oscillation can be avoided.

Note that, in the second embodiment, the gas turbine output correction amount calculation unit 56 may acquire the CSO from the gas turbine output control unit, may read out the coefficient P that has been prescribed in advance, and may multiply the CSO by the weighting coefficient P as it is without correction, thus calculating the gas turbine output correction amount.

Third Embodiment

Figure 9:
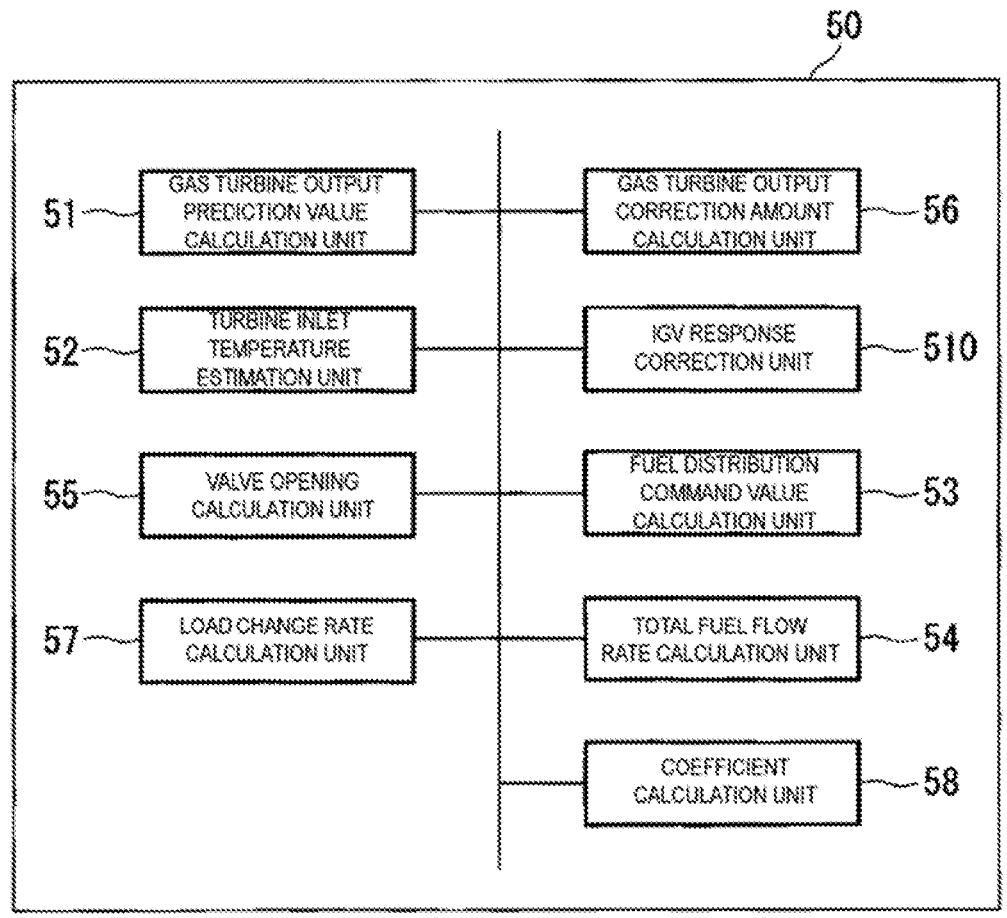
FIG. 9 is a block diagram illustrating an example of the fuel control device of a third embodiment according to the present invention.
Figure 10:
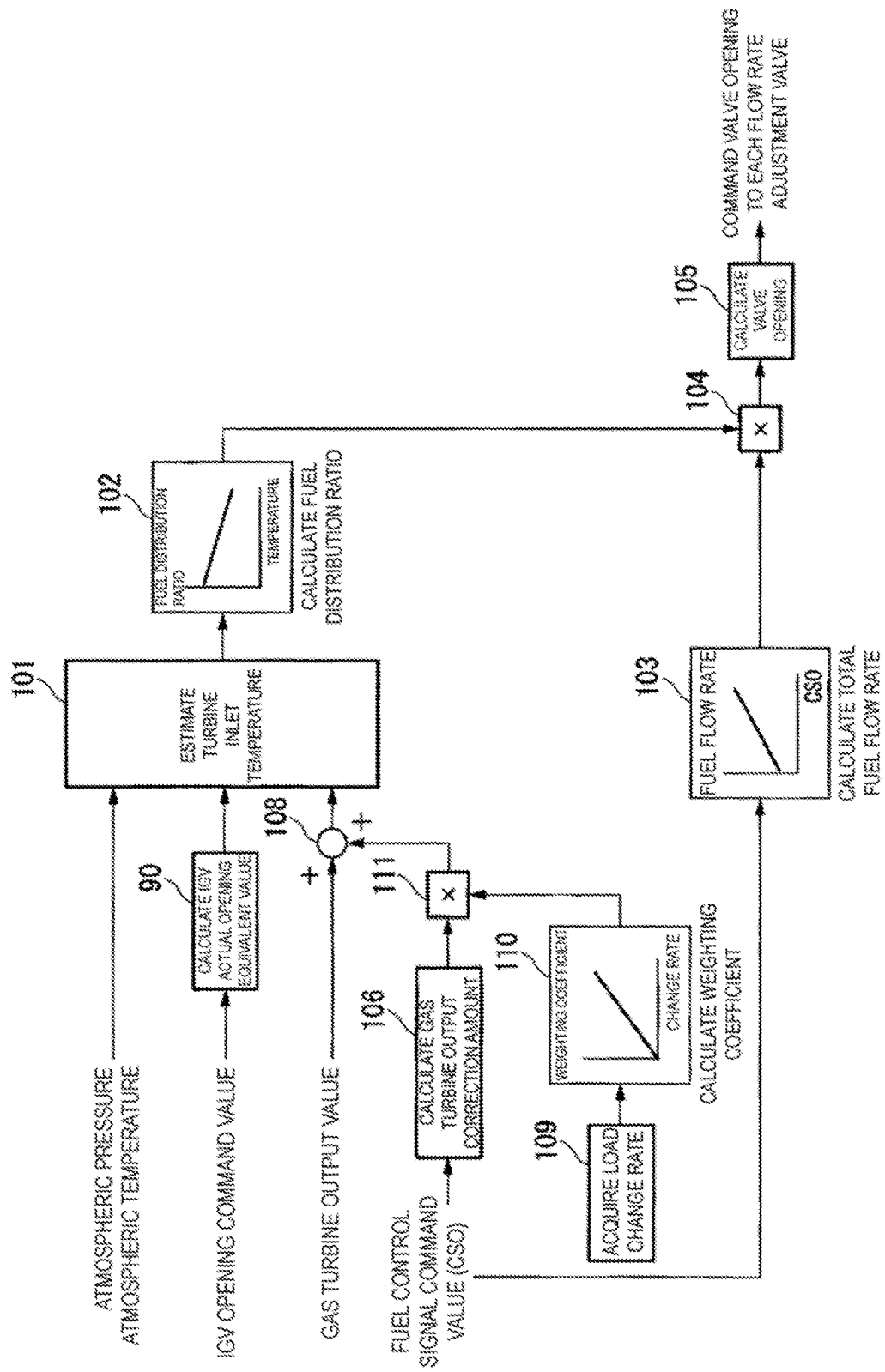
FIG. 10 is a diagram illustrating an example of the fuel distribution control of the third embodiment according to the present invention.

The following is a description of the fuel control device according to a third embodiment of the present invention, with reference to FIGS. 9 and 10.

FIG. 9 is a block diagram illustrating an example of the fuel control device of the present embodiment.

As illustrated in FIG. 9, the fuel control device 50 of the present embodiment is further provided with a load change rate calculation unit 57, and a coefficient calculation unit 58. The rest of the configuration is the same as that of the second embodiment.

The load change rate calculation unit 57 acquires an output measured value of the generator 16 from the power meter 17. The load change rate calculation unit 57 calculates a rate of change of the load (the output measured value) per unit time.

The coefficient calculation unit 58 acquires a weighting coefficient corresponding to the gas turbine output correction amount, in accordance with the calculated load change rate. A table in which the load change rates and the weighting coefficients are associated with each other, and/or mathematical functions are stored in the storage unit in advance. The coefficient calculation unit 58 reads out that table or the like, and obtains the weighting coefficient corresponding to the calculated load change.

Alternatively, in order to acquire the weighting coefficient, the coefficient calculation unit 58 need not necessarily calculate the load change rate on the basis of the actual measured value of the load, and may use, in place of the load change rate, a target rate of the output changes in order to reach a target output of the gas turbine with respect to the load changes that change moment to moment. The value of this target rate is a value that is calculated by the gas turbine output control unit in the course of determining the CSO. The load change rate calculation unit 57 acquires the target rate of the output changes that has been prescribed in advance with respect to the load changes, from the gas turbine output control unit. Then, the coefficient calculation unit 58 acquires the weighting coefficient, from a correspondence table of the target rates and the weighting coefficients, or the like.

FIG. 10 is a diagram illustrating an example of the fuel distribution control of the third embodiment according to the present invention.

The fuel distribution control of the present embodiment is described using FIG. 10.

First, the load change rate calculation unit 57 calculates the load change rate (reference sign 109). Then, the load change rate calculation unit 57 outputs the calculated load change rate to the coefficient calculation unit 58. On the basis of the acquired load change rate, the coefficient calculation unit 58 acquires the weighting coefficient that accords with the load change rate, from the table in which the load change rates and the weighting coefficients are associated with each other, and/or from mathematical functions (reference sign 110), and outputs the acquired weighting coefficient to the gas turbine output correction amount calculation unit 56.

The gas turbine output correction amount calculation unit 56 calculates the gas turbine output correction amount on the basis of the CSO in a similar manner to that of the second embodiment (reference sign 106). Then, the gas turbine output correction amount calculation unit 56 multiplies the calculated gas turbine output correction amount by the weighting coefficient that accords with the load change rate acquired from the coefficient calculation unit 58, and calculates the gas turbine output correction amount that accords with the load change rate (reference sign 111). The gas turbine output correction amount calculation unit 56 outputs, to the gas turbine output prediction value calculation unit 51, the gas turbine output correction amount that accords with the calculated load change rate. The gas turbine output prediction value calculation unit 51 adds the gas turbine output value to the correction amount acquired from the gas turbine output correction amount calculation unit 56, and thus calculates the gas turbine output prediction value (reference sign 108). Since the subsequent processes are the same as those of the first embodiment, a description thereof is omitted.

Note that when the target rate is used in place of the load change rate, the load change rate calculation unit 57 acquires the target rate from the gas turbine output control unit (reference sign 109) and outputs the acquired target rate to the coefficient calculation unit 58. The coefficient calculation unit 58 calculates the weighting coefficient that accords with the target rate, from a table in which the target rates and the weighting coefficients are associated with each other, and/or from mathematical functions (reference sign 110), and outputs the acquired weighting coefficient to the gas turbine output correction amount calculation unit 56. The subsequent processes are the same as those when using the load change rate.

According to the present embodiment, the gas turbine output correction amount that accords with the load change rate can be obtained. In this way, the distribution ratio control of the fuel can be performed on the basis of the more accurate turbine inlet temperature estimation value, and the risk of the occurrence of combustion oscillation can be further reduced.

Further, also in the third embodiment, by estimating the turbine inlet temperature using the IGV opening equivalent value that is the corrected IGV opening command value, the discrepancy with the actual turbine inlet temperature can be compensated for in advance more rapidly than in the conventional technology, without measuring the actual opening. In this way, according to the control of the fuel control device of the second embodiment, even during a transition period of load changes, the discrepancy between the operation line and the target operation line can be reduced and the occurrence of combustion oscillation can be avoided.

Note that, in the third embodiment, the gas turbine output correction amount calculation unit 56 may acquire the CSO from the gas turbine output control unit in the processing at reference sign 106, and may multiply the CSO by the weighting coefficient that accords with the load change rate as it is without correction, thus calculating the gas turbine output correction amount.

Fourth Embodiment

Figure 11:
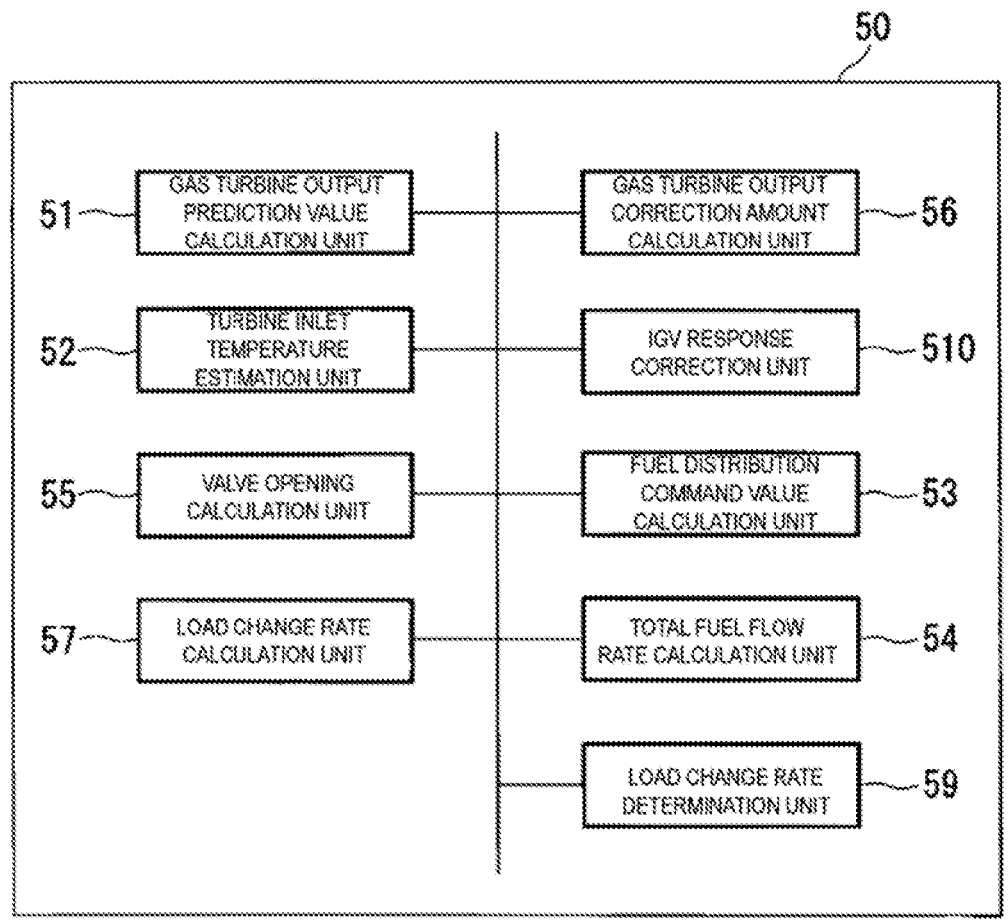
FIG. 11 is a block diagram illustrating an example of the fuel control device of a fourth embodiment according to the present invention.
Figure 12:
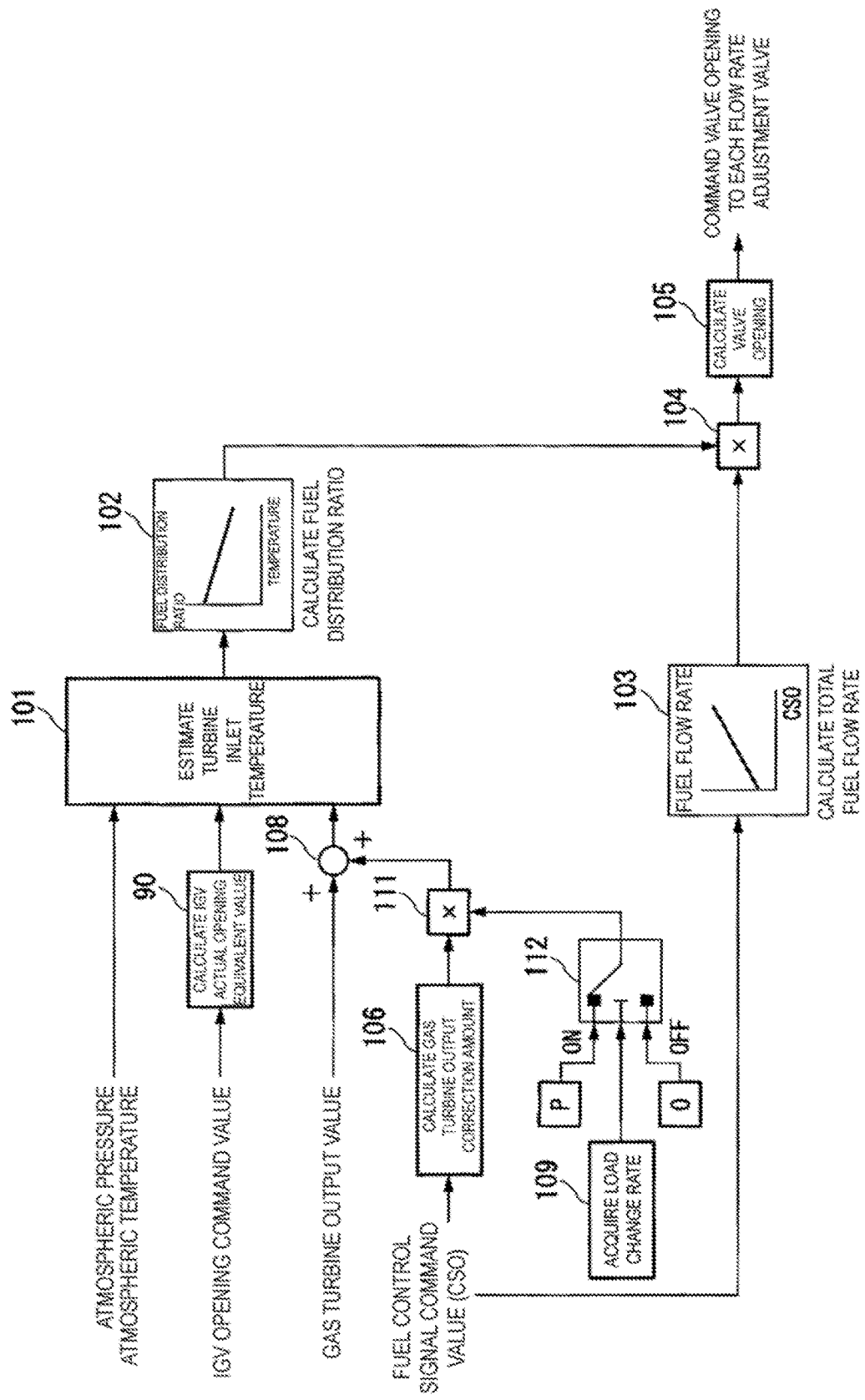
FIG. 12 is a diagram illustrating an example of the fuel distribution control of the fourth embodiment according to the present invention.

The following is a description of the fuel control device according to a fourth embodiment of the present invention, with reference to FIGS. 11 and 12.

FIG. 11 is a block diagram illustrating an example of the fuel control device of the present embodiment.

As illustrated in FIG. 11, the fuel control device 50 of the present embodiment is provided with a load change rate determination unit 59 in place of the coefficient calculation unit 58. The rest of the configuration is the same as that of the third embodiment.

The load change rate determination unit 59 acquires the load change rate calculated by the load change rate calculation unit 57, and compares that value with a pre-set threshold value Q stored in advance in the storage unit. If the load change rate is equal to or greater than the threshold value Q, the load change rate determination unit 59 outputs, to the gas turbine output correction amount calculation unit 56, the weighting coefficient P that has been prescribed in advance. Further, if the load change rate is smaller than the threshold value Q, the load change rate determination unit 59 sets the value "0" as the weighting coefficient and outputs this to the gas turbine output correction amount calculation unit 56. This threshold value Q is a value used to determine whether or not the correction amount calculated by the gas turbine output correction amount calculation unit 56 is reflected in the gas turbine output value.

FIG. 12 is a diagram illustrating an example of the fuel distribution control of the fourth embodiment according to the present invention.

The fuel distribution control of the present embodiment is described using FIG. 12.

First, the load change rate calculation unit 57 calculates the load change rate (reference sign 109). Then, the load change rate calculation unit 57 outputs the calculated load change rate to the load change rate determination unit 59. The load change rate determination unit 59 determines whether or not the acquired load change rate is equal to or greater than the threshold value Q. If the load change rate is equal to or greater than the threshold value Q, the load change rate determination unit 59 reads out the weighting coefficient P from the storage unit, and outputs the weighting coefficient P to the gas turbine output correction amount calculation unit 56. Further, if the load change rate is smaller than the threshold value Q, the load change rate determination unit 59 outputs the value "0" to the gas turbine output correction amount calculation unit 56 (reference sign 112).

The gas turbine output correction amount calculation unit 56 calculates a gas turbine correction amount on the basis of the CSO in a similar manner to that of the second and third embodiments. The gas turbine output correction amount calculation unit 56 multiplies the gas turbine correction amount by the weighting coefficient acquired from the load change rate determination unit 59, and calculates the gas turbine output correction amount (reference sign Ill). The gas turbine output correction amount calculation unit 56 outputs the calculated gas turbine output correction amount to the gas turbine output prediction value calculation unit 51. When the load change rate is smaller than the threshold value Q, since the weighting coefficient is "0," the correction amount output by the gas turbine output correction amount calculation unit 56 is "0."

The gas turbine output prediction value calculation unit 51 adds the gas turbine output value to the correction amount acquired from the gas turbine output correction amount calculation unit 56, and thus calculates the gas turbine output prediction value (reference sign 108). When the load change rate is smaller than the threshold value Q, since the weighting coefficient is "0," the correction amount output by the gas turbine output correction amount calculation unit 51 outputs the actually measured gas turbine output value to the turbine inlet temperature estimation unit 52. Since the subsequent processes are the same as those of the first embodiment, a description thereof is omitted.

According to the present embodiment, the value of the gas turbine output value can be corrected by the correction value on the basis of the CSO, only in the case of an intended load change rate, on the basis of the magnitude of the load change rate. At a time of actual operation, even if the output of the gas turbine is constant, changes in the fuel calorie, changes in the fuel supply pressure and the like sometimes occur, and the CSO sometimes fluctuates in accordance with these changes. If this occurs, in the case of the first to third embodiments, the fluctuating CSO has an impact, and the turbine inlet temperature estimation value fluctuates. According to the present embodiment, the risk can be reduced that such changes in peripheral conditions result in unsuitable changes to the fuel distribution ratios and cause combustion oscillation to occur.

Further, also in the fourth embodiment, by estimating the turbine inlet temperature using the IGV opening equivalent value that is the corrected IGV opening command value, the discrepancy with the actual turbine inlet temperature can be compensated for in advance more rapidly than in the conventional technology, without measuring the actual opening. In this way, according to the control of the fuel control device of the second embodiment, even during a transition period of load changes, the discrepancy between the operation line and the target operation line can be reduced and the occurrence of combustion oscillation can be avoided.

Note that, in the fourth embodiment, the gas turbine output correction amount calculation unit 56 may acquire the CSO from the gas turbine output control unit in the processing at reference sign 106, and may multiply the CSO as it is without correction, by the weighting coefficient that accords with the load change rate, thus calculating the gas turbine output correction amount.

Fifth Embodiment

Figure 13:
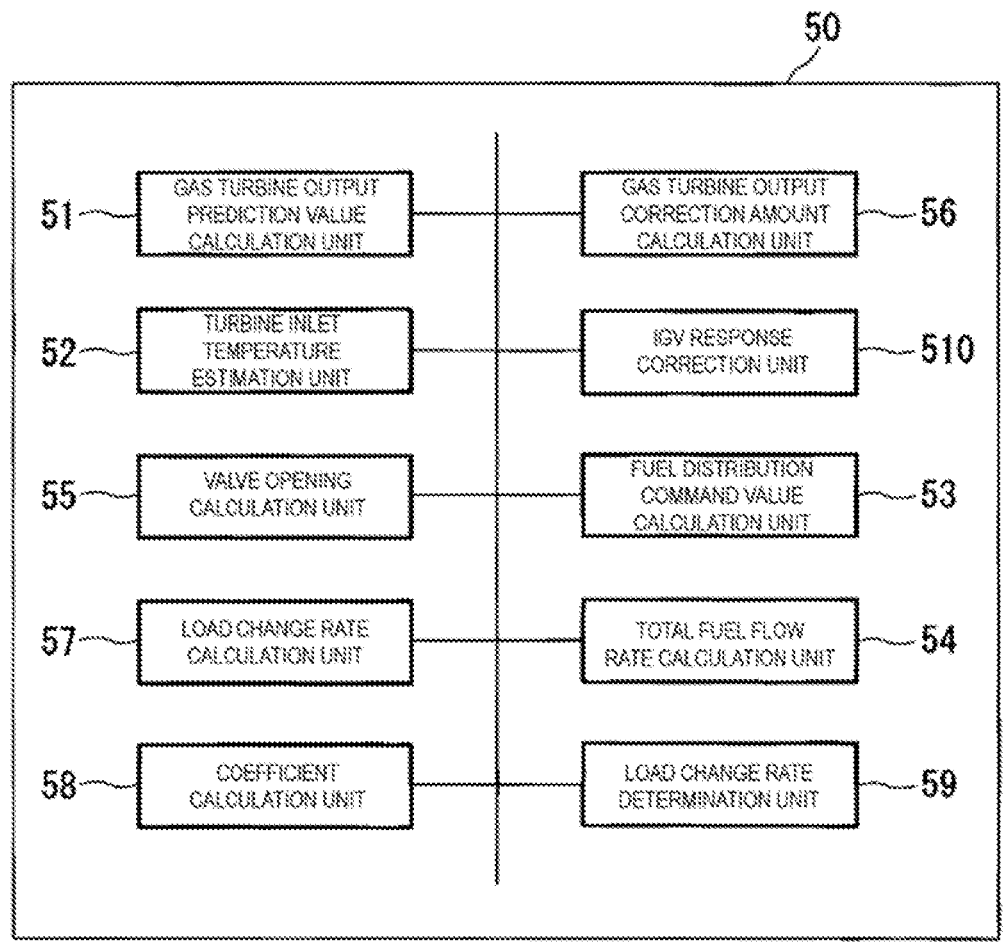
FIG. 13 is a block diagram illustrating an example of the fuel control device of a fifth embodiment according to the present invention.
Figure 14:
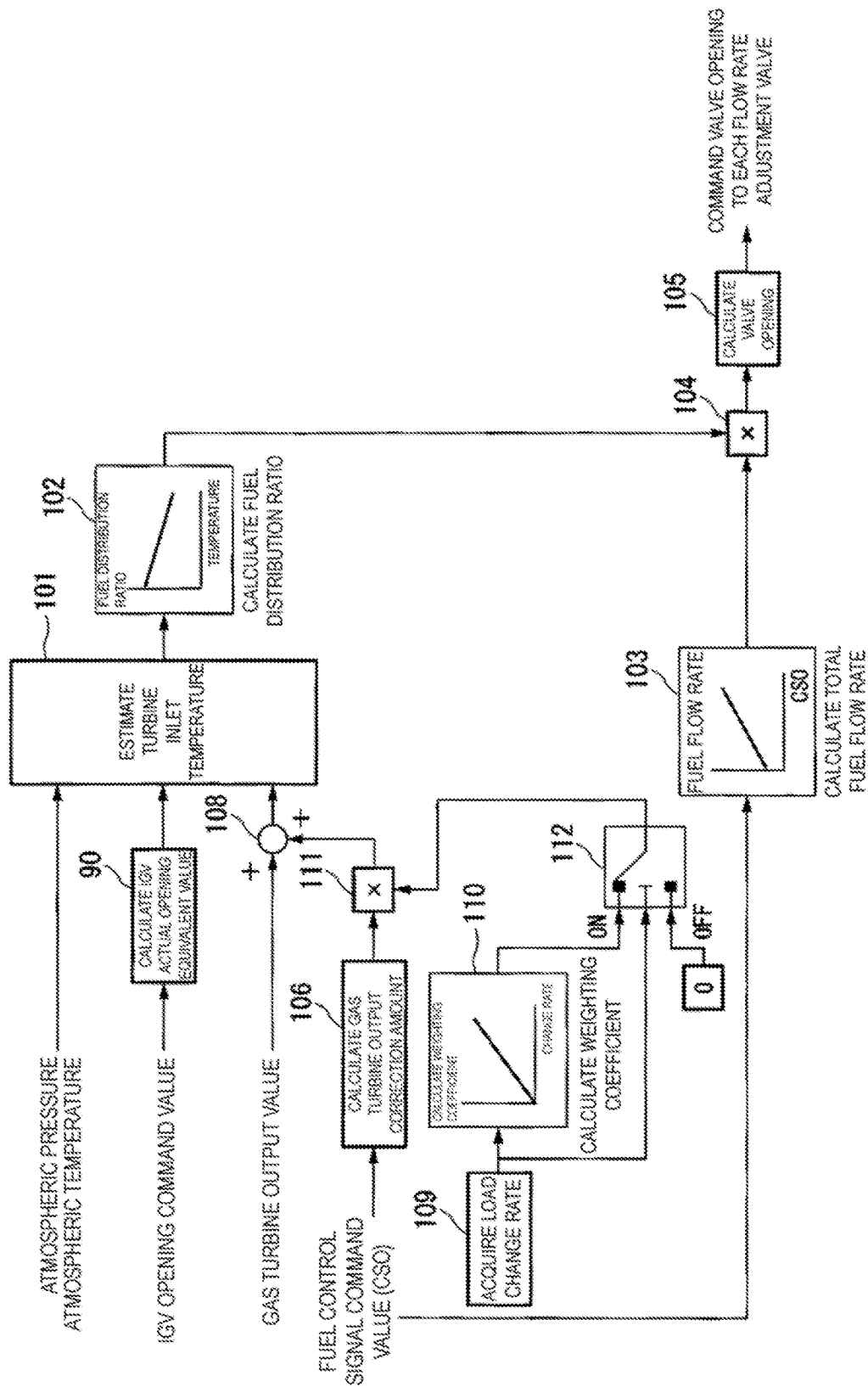
FIG. 14 is a diagram illustrating an example of the fuel distribution control of the fifth embodiment according to the present invention.

The following is a description of the fuel control device according to a fifth embodiment of the present invention, with reference to FIGS. 13 and 14.

FIG. 13 is a block diagram illustrating an example of the fuel control device of the present embodiment.

As illustrated in FIG. 13, the fuel control device 50 of the present embodiment is provided with the load change rate calculation unit 57, the coefficient calculation unit 58, and the load change rate determination unit 59. The rest of the configuration is the same as that of the second embodiment.

FIG. 14 is a diagram illustrating an example of the fuel distribution control of the fifth embodiment of the present invention.

The fuel distribution control according to the present embodiment is described using FIG. 14. The present embodiment is an embodiment combining the third embodiment and the fourth embodiment.

First, the load change rate calculation unit 57 calculates the load change rate (reference sign 109). Then, the load change rate calculation unit 57 outputs the calculated load change rate to the coefficient calculation unit 58 and the load change rate determination unit 59.

The coefficient calculation unit 58 determines the weighting coefficient on the basis of the load change rate, in a similar manner to that of the third embodiment (reference sign 110). Then, the coefficient calculation unit 58 outputs that weighting coefficient to the load change rate determination unit 59.

The load change rate determination unit 59 determines whether or not the load change rate acquired from the load change rate calculation unit 57 is equal to or greater than the threshold value Q, and, when the load change rate is equal to or greater than the threshold value Q, the load change rate determination unit 59 outputs the weighting coefficient that accords with the load change rate and that is acquired from the coefficient calculation unit 58 to the gas turbine output correction amount calculation unit 56. Further, when the load change rate is smaller than the threshold value Q, the load change rate determination unit 59 outputs the value "0" to the gas turbine output correction amount calculation unit 56 (reference sign 112).

The gas turbine output correction amount calculation unit 56 calculates the gas turbine output correction value from the CSO in a similar manner to the second to fourth embodiments (reference sign 106), and multiplies it by the weighting coefficient acquired from the load change rate determination unit 59 (reference sign 111). The gas turbine output prediction value calculation unit 51 acquires the multiplied value, adds the multiplied value to the actually measured gas turbine output value, and calculates the gas turbine output prediction value (reference sign 108).

The turbine inlet temperature estimation unit 52 calculates the gas turbine inlet temperature on the basis of the gas turbine output prediction value calculated in this manner, the atmospheric temperature, the atmospheric pressure, and the IGV opening command value. The fuel distribution command value calculation unit 53 determines the distribution ratios of the fuel supplied to each of the fuel supply systems on the basis of this turbine inlet temperature.

According to the present embodiment, the effects of the second to fourth embodiments can be combined and achieved.

Sixth Embodiment

Figure 15:
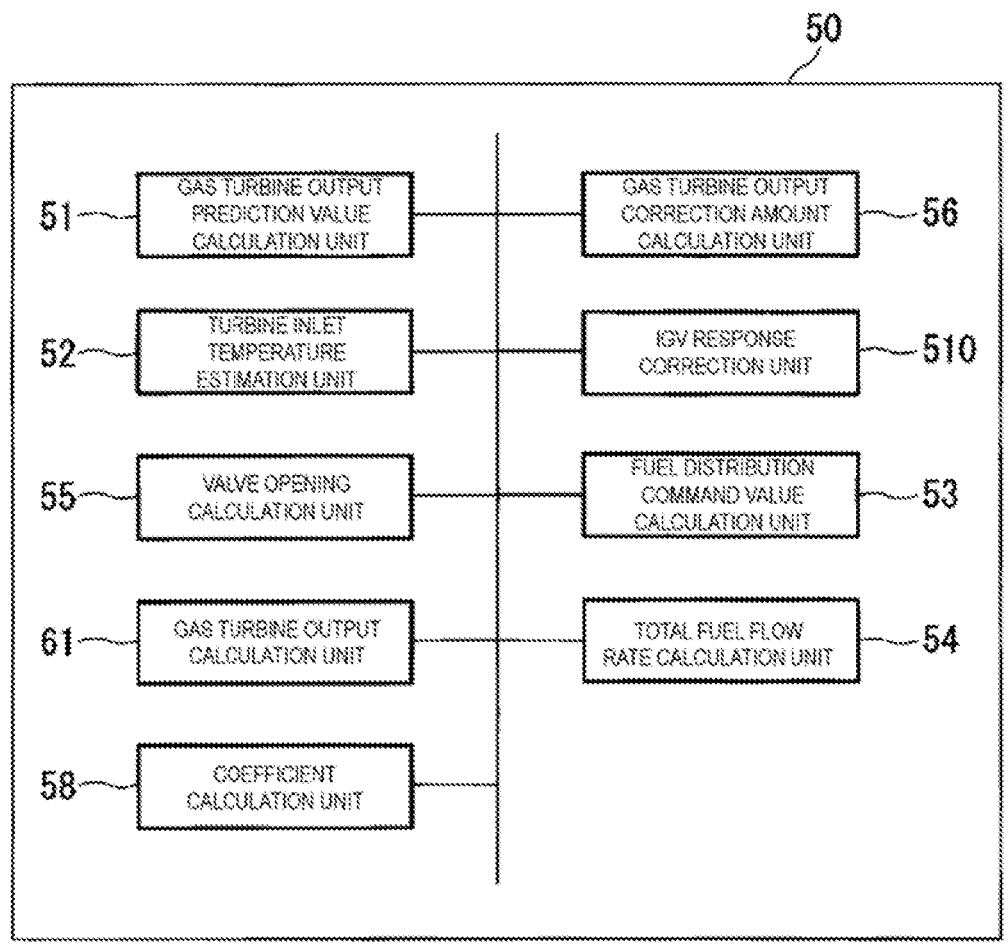
FIG. 15 is a block diagram illustrating an example of the fuel control device of a sixth embodiment according to the present invention.
Figure 16:
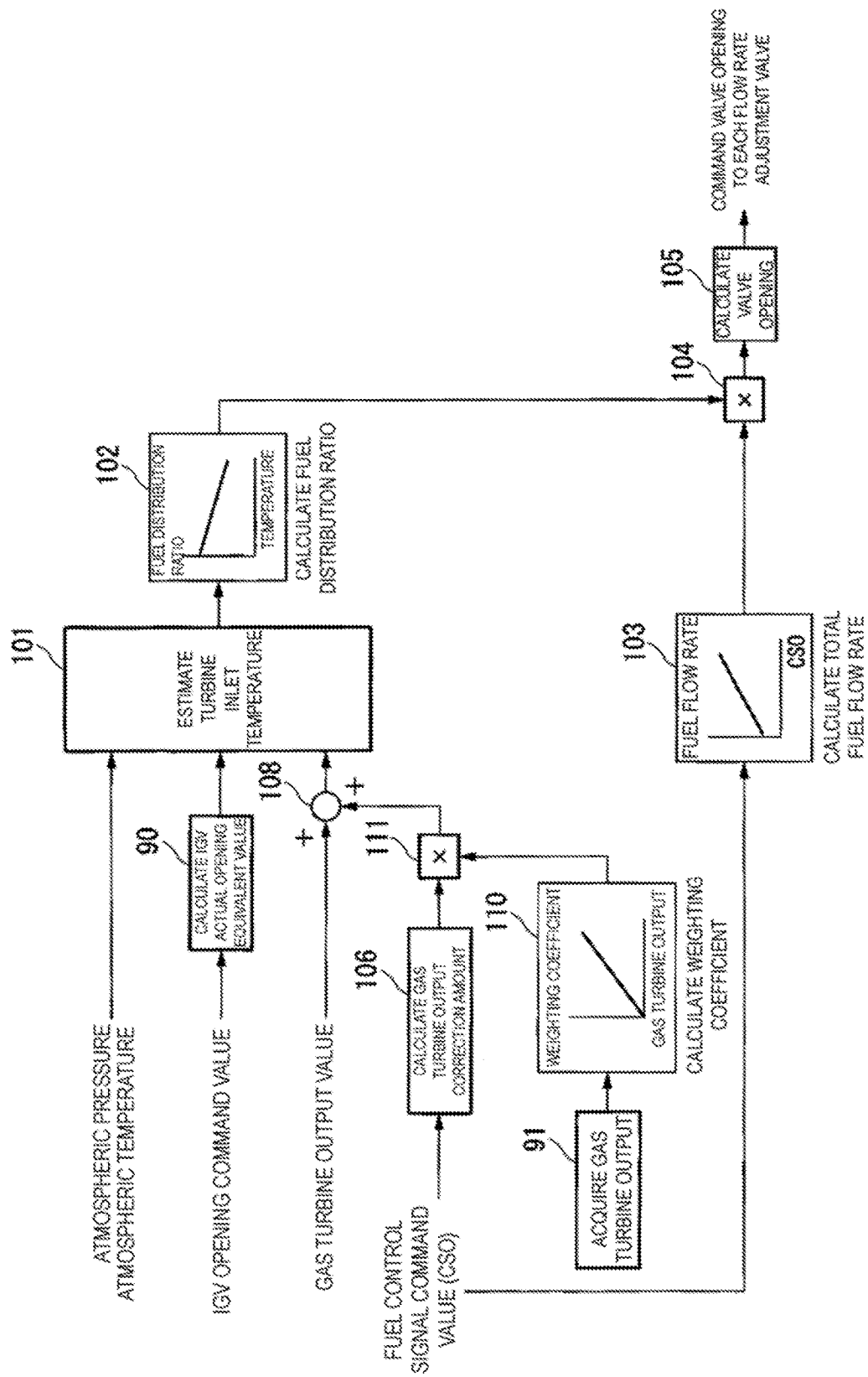
FIG. 16 is a diagram illustrating an example of the fuel distribution control of the sixth embodiment according to the present invention.

The following is a description of the fuel control device according to a sixth embodiment of the present invention, with reference to FIGS. 15 and 16.

FIG. 15 is a block diagram illustrating an example of the fuel control device of the present embodiment.

As illustrated in FIG. 15, the fuel control device 50 of the present embodiment is further provided with a gas turbine output calculation unit 61, and the coefficient calculation unit 58. The rest of the configuration is the same as that of the second embodiment.

The gas turbine output calculation unit 61 calculates the gas turbine output (reference sign 91). The gas turbine output calculation unit 61 outputs the calculated gas turbine output to the coefficient calculation unit 58. On the basis of the acquired gas turbine output, the coefficient calculation unit 58 acquires the weighting coefficient that accords with the gas turbine output, from a table in which the gas turbine outputs and the weighting coefficients are associated with each other, and/or from mathematical functions (reference sign 110), and outputs the acquired weighting coefficient to the gas turbine output correction amount calculation unit 56.

The gas turbine output correction amount calculation unit 56 calculates the gas turbine output correction amount on the basis of the CSO in a similar manner to that of the second embodiment (reference sign 106). Then, the gas turbine output correction amount calculation unit 56 multiplies the calculated gas turbine output correction amount by the weighting coefficient that accords with the load change rate acquired from the coefficient calculation unit 58, and calculates the gas turbine output correction amount that accords with the load change rate (reference sign 111). The gas turbine output correction amount calculation unit 56 outputs, to the gas turbine output prediction value calculation unit 51, the gas turbine output correction amount that accords with the calculated load change rate. The gas turbine output prediction value calculation unit 51 adds the gas turbine output value to the correction amount acquired from the gas turbine output correction amount calculation unit 56, and thus calculates the gas turbine output prediction value (reference sign 108). Since the subsequent processes are the same as those of the first embodiment, a description thereof is omitted.

According to the present embodiment, the gas turbine output correction amount that accords with the gas turbine output can be obtained. In this way, the distribution ratio control of the fuel can be performed on the basis of the more accurate turbine inlet temperature estimation value, and the risk of the occurrence of combustion oscillation can be further reduced.

Further, also in the sixth embodiment, by estimating the turbine inlet temperature using the IGV opening equivalent value that is the corrected IGV opening command value, the discrepancy with the actual turbine inlet temperature can be compensated for in advance more rapidly than in the conventional technology, without measuring the actual opening. In this way, according to the control of the fuel control device of the sixth embodiment, even during a transition period of load changes, the discrepancy between the operation line and the target operation line can be reduced and the occurrence of combustion oscillation can be avoided.

Note that, in the sixth embodiment, the gas turbine output correction amount calculation unit 56 may acquire the CSO from the gas turbine output control unit in the processing at reference sign 106, and may multiply the CSO as it is without correction by the weighting coefficient that accords with the load change rate, thus calculating the gas turbine output correction amount.

Seventh Embodiment

Figure 17:
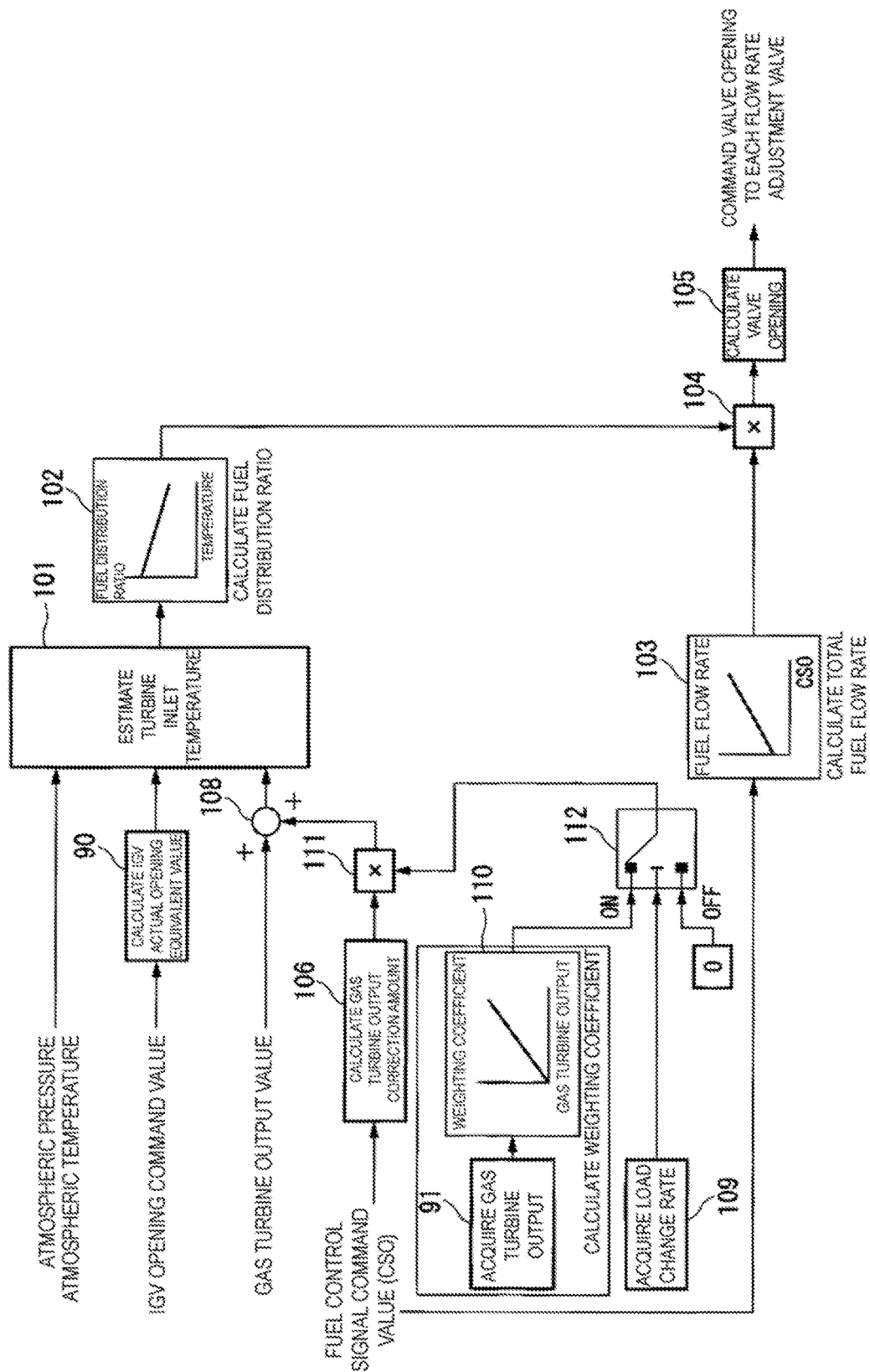
FIG. 17 is a diagram illustrating an example of the fuel distribution control of a seventh embodiment according to the present invention.

FIG. 17 is a diagram illustrating an example of the fuel distribution control of a seventh embodiment according to the present invention.

The fuel control device of the seventh embodiment is provided with the functions of the fuel control device according to the fourth embodiment and of the fuel control device according to the sixth embodiment. In other words, the fuel control device of the seventh embodiment is provided with the coefficient calculation unit 58 illustrated in FIG. 15, in addition to each of the processing units illustrated in FIG. 11.

In this way, in the fuel control device of the seventh embodiment, the load change rate calculation unit 57 calculates the load change rate (reference sign 109). Then, the load change rate calculation unit 57 outputs the calculated load change rate to the load change rate determination unit 59. Meanwhile, on the basis of the acquired gas turbine output, the coefficient calculation unit 58 calculates the weighting coefficient that accords with the gas turbine output, from the table in which the gas turbine outputs and the weighting coefficients are associated with each other, and/or from mathematical functions (reference sign 110). The load change rate determination unit 59 determines whether or not the acquired load change rate is equal to or greater than the threshold value Q. If the load change rate is equal to or greater than the threshold value Q, the load change rate determination unit 59 outputs, to the gas turbine output correction amount calculation unit 56, the weighting coefficient calculated by the coefficient calculation unit 58. Further, if the load change rate is smaller than the threshold value Q, the load change rate determination unit 59 outputs the value "0" to the gas turbine output correction amount calculation unit 56 (reference sign 112). The subsequent processing is the same as that of the fourth embodiment.

According to the seventh embodiment, both the effects of the fourth embodiment and of the sixth embodiment can be obtained.

Note that when the target rate is used in place of the load change rate, the load change rate calculation unit 57 acquires the target rate from the gas turbine output control unit (reference sign 109) and outputs the acquired target rate to the coefficient calculation unit 58. The coefficient calculation unit 58 calculates the weighting coefficient that accords with the target rate, from the table in which the target rates and the weighting coefficients are associated with each other, and/or from mathematical functions (reference sign 110), and outputs the acquired weighting coefficient to the gas turbine output correction amount calculation unit 56. The subsequent processes are the same as those when using the load change rate.

Eighth Embodiment

Figure 18:
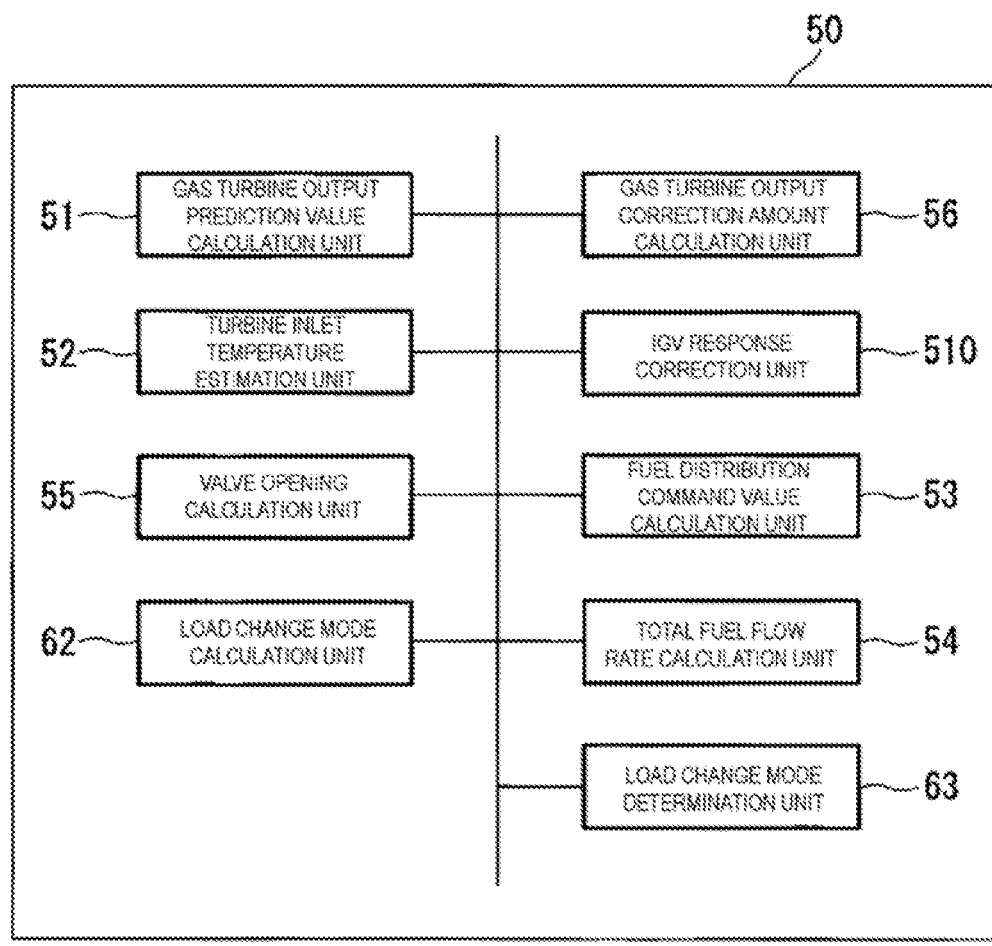
FIG. 18 is a block diagram illustrating an example of the fuel control device of an eighth embodiment according to the present invention.
Figure 19:
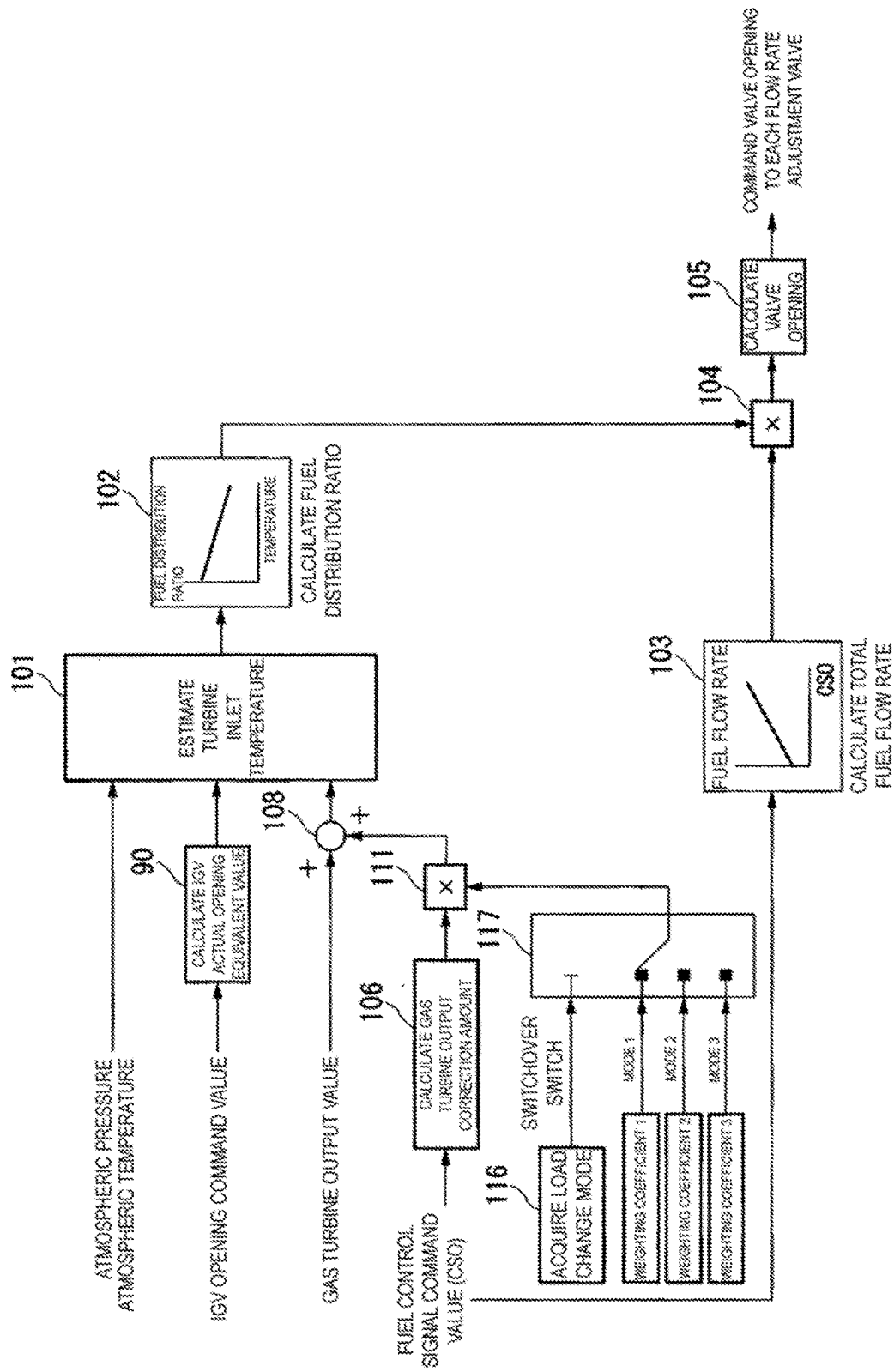
FIG. 19 is a diagram illustrating an example of the fuel distribution control of the eighth embodiment according to the present invention.

The following is a description of the fuel control device according to an eighth embodiment of the present invention, with reference to FIGS. 18 and 19.

FIG. 18 is a block diagram illustrating an example of the fuel control device of the present embodiment.

As illustrated in FIG. 18, the fuel control device 50 of the present embodiment is provided with a load change mode calculation unit 62, and a load change mode determination unit 63. The rest of the configuration is the same as that of the second embodiment. The load change mode is a mode that is divided into at least two or more, depending on a magnitude of the changes in the load per unit time. The load change mode determination unit 63 outputs, to the gas turbine output correction amount calculation unit 56, a weighting coefficient that has been prescribed in advance depending on the load change mode calculated by the load change mode calculation unit 62. This load change mode is used in order to make the weighting coefficient output to the correction amount calculated by the gas turbine output correction amount calculation unit 56 more accurate.

FIG. 19 is a diagram illustrating an example of the fuel distribution control of the eighth embodiment according to the present invention. The fuel distribution control according to the present embodiment is described using FIG. 19.

First, the load change mode calculation unit 62 calculates the load change mode of the gas turbine (reference sign 116). The fuel control device 50 of the present embodiment specifies which of three modes the load change mode is, namely, one of a mode 1, a mode 2, and a mode 3. The mode 1 of the present embodiment is a high-speed change mode when the load change rate is a value equal to or greater than a first threshold value that is prescribed in advance. The mode 2 of the present embodiment is an intermediate-speed change mode when the load change rate is a value equal to or greater than a second threshold value that is prescribed in advance. The mode 3 of the present embodiment is a low-speed change mode when the load change rate is a value equal to or greater than a third threshold value that is prescribed in advance. In the present embodiment, a magnitude correlation between these threshold values is first threshold value>second threshold value>third threshold value.

Then, the load change mode calculation unit 62 outputs the calculated load change mode to the load change mode determination unit 63 (reference sign 117). On the basis of the acquired load change mode, the load change mode determination unit 63 acquires the weighting coefficient that accords with the load change mode (reference sign 117), and outputs the acquired weighting coefficient to the gas turbine output correction amount calculation unit 56. The weighting mathematical functions of the present embodiment correspond to the three load change modes, and are one of a weighting coefficient 1 (corresponding to the mode 1), a weighting coefficient 2 (corresponding to the mode 2), and a weighting coefficient 3 (corresponding to the mode 3).

The gas turbine output correction amount calculation unit 56 calculates the gas turbine output correction amount on the basis of the CSO in a similar manner to that of the second embodiment (reference sign 106). Then, the gas turbine output correction amount calculation unit 56 multiplies the calculated gas turbine output correction amount by the weighting coefficient that accords with the load change rate acquired from the coefficient calculation unit 58, and calculates the gas turbine output correction amount that accords with the load change rate (reference sign 111). The gas turbine output correction amount calculation unit 56 outputs, to the gas turbine output prediction value calculation unit 51, the gas turbine output correction amount that accords with the calculated load change rate. The gas turbine output prediction value calculation unit 51 adds the gas turbine output value to the correction amount acquired from the gas turbine output correction amount calculation unit 56, and thus calculates the gas turbine output prediction value (reference sign 108). Since the subsequent processes are the same as those of the first embodiment, a description thereof is omitted.

According to the present embodiment, the gas turbine output correction amount that accords with the load change mode can be obtained. In this way, the distribution ratio control of the fuel can be performed on the basis of the more accurate turbine inlet temperature estimated value, and the risk of the occurrence of combustion oscillation can be further reduced.

Further, also in the eighth embodiment, by estimating the turbine inlet temperature using the IGV opening equivalent value that is the corrected IGV opening command value, the discrepancy with the actual turbine inlet temperature can be compensated for in advance more rapidly than in the conventional technology, without measuring the actual opening. In this way, according to the control of the fuel control device of the eighth embodiment, even during a transition period of load changes, the discrepancy between the operation line and the target operation line can be reduced and the occurrence of combustion oscillation can be avoided.

Note that, in the eighth embodiment, the gas turbine output correction amount calculation unit 56 may acquire the CSO from the gas turbine output control unit in the processing at reference sign 106, and may multiply the CSO as it is without correction by the weighting coefficient that accords with the load change rate, thus calculating the gas turbine output correction amount.

Ninth Embodiment

Figure 20:
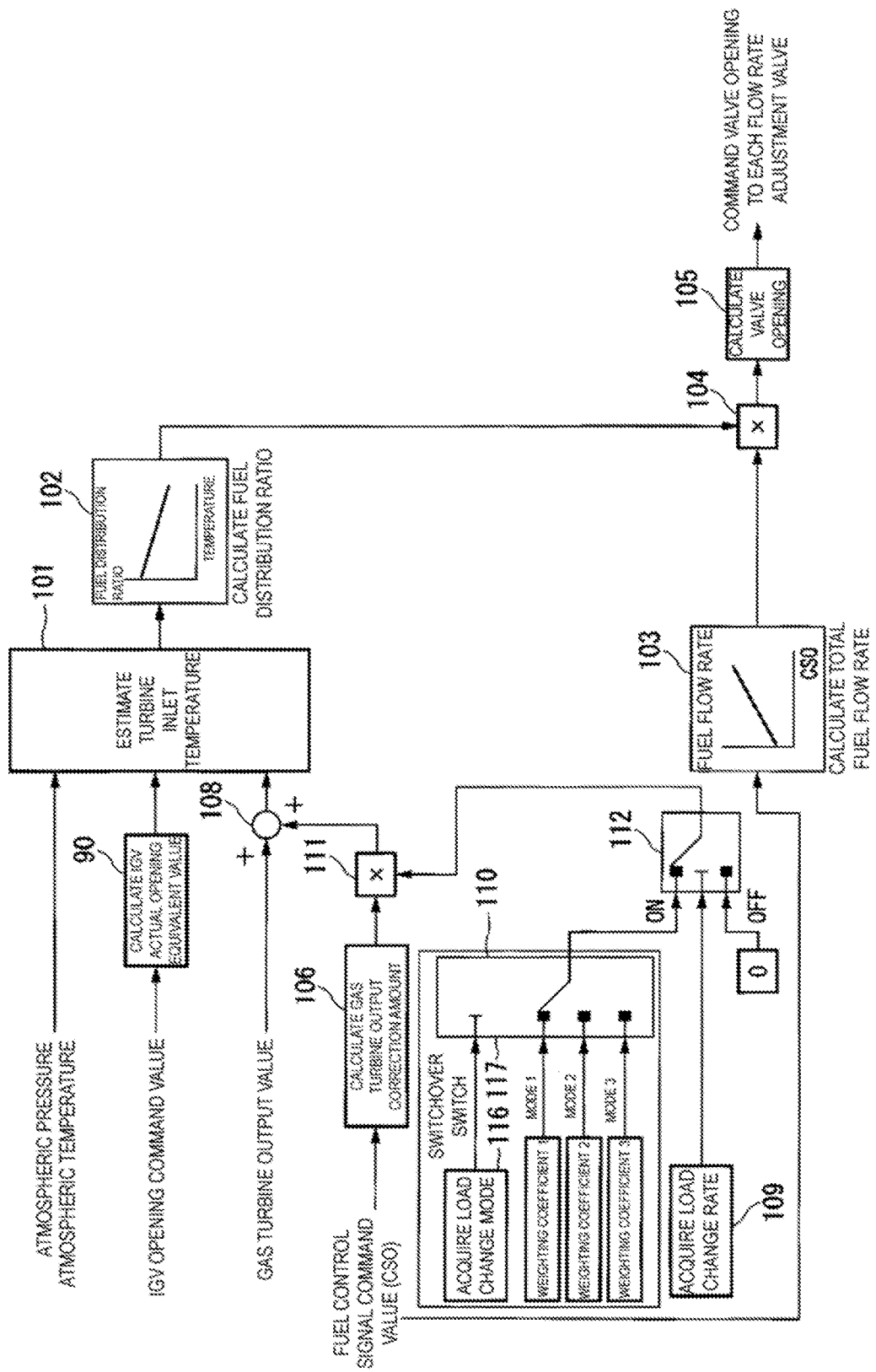
FIG. 20 is a diagram illustrating an example of the fuel distribution control of a ninth embodiment according to the present invention.
Figure 21:
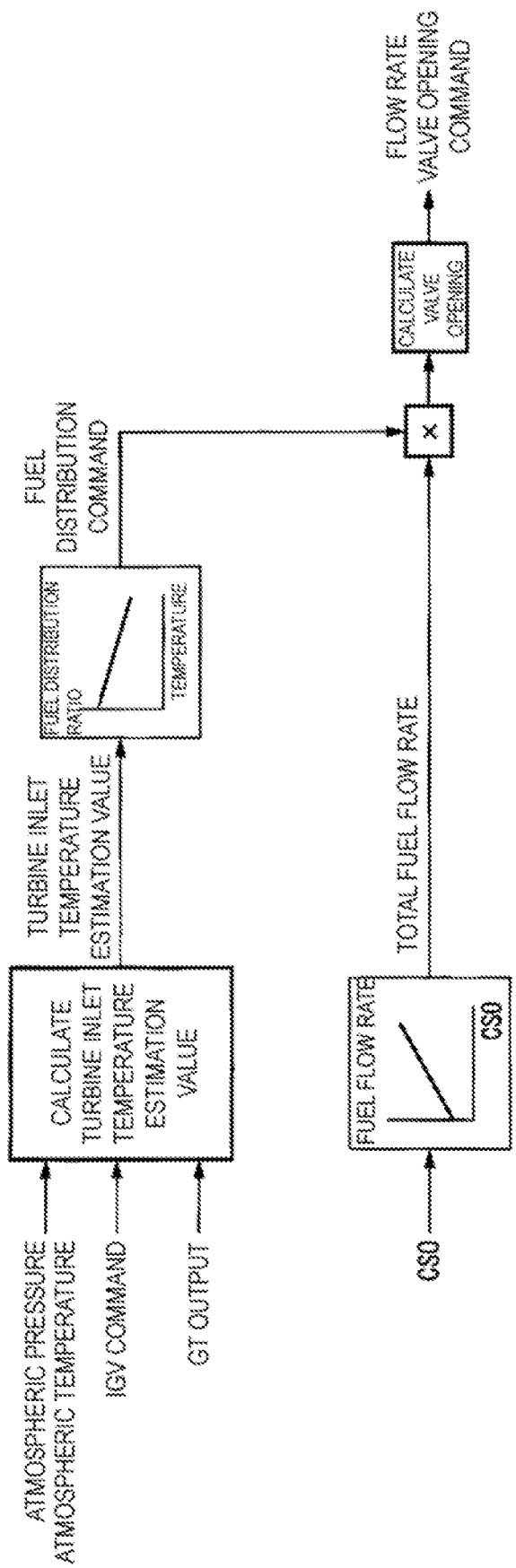
FIG. 21 is a diagram illustrating an example of conventional gas turbine fuel distribution control.

FIG. 20 is a diagram illustrating an example of the fuel distribution control of a ninth embodiment according to the present invention.

The fuel control device of the ninth embodiment is provided with the functions of the fuel control device according to the fourth embodiment and of the fuel control device according to the eighth embodiment. In other words, the fuel control device of the ninth embodiment is provided with the load change mode calculation unit 62 and the load change mode determination unit 63 illustrated in FIG. 15, in addition to each of the processing units illustrated in FIG. 11.

In this way, in the fuel control device of the ninth embodiment, the load change rate calculation unit 57 calculates the load change rate (reference sign 109). Then, the load change rate calculation unit 57 outputs the calculated load change rate to the load change rate determination unit 59. Meanwhile, the load change mode calculation unit 62 calculates the load change mode in a similar manner to that of the eighth embodiment (reference sign 116). The load change mode calculation unit 62 outputs the calculated load change mode to the load change mode determination unit 63 (reference sign 117). On the basis of the acquired load change mode, the load change mode determination unit 63 acquires the weighting coefficient corresponding to the load change mode (reference sign 117). The load change rate determination unit 59 determines whether or not the acquired load change rate is equal to or greater than the threshold value Q. If the load change rate is equal to or greater than the threshold value Q, the load change rate determination unit 59 outputs, to the gas turbine output correction amount calculation unit 56, the weighting coefficient acquired by the load change mode determination unit 63. Further, if the load change rate is smaller than the threshold value Q, the load change rate determination unit 59 outputs the value "0" to the gas turbine output correction amount calculation unit 56 (reference sign 112). The subsequent processing is the same as that of the fourth embodiment.

According to the ninth embodiment, both the effects of the fourth embodiment and of the eighth embodiment can be obtained.

Note that the turbine inlet temperature estimation unit 52 is an example of a combustion temperature estimation value calculation unit. Further, the atmospheric pressure and the atmospheric temperature are an example of atmospheric conditions. In addition, the load change rate and the target rate are an example of a value indicating the output changes of the gas turbine per unit time. Further, the IGV 14 is an example of a valve to control the amount of air caused to be mixed and combusted with the fuel.

Note that the above-described fuel control device 50 internally includes a computer system. The various steps of the processing by the above-described fuel control device 50 are stored on a computer-readable recording medium in the form of a program, and the computer reads and executes the program to implement the above-described processing. Here, the computer readable storing medium refers to a magnetic disk, a magneto-optical disk, a CD-ROM, a DVD-ROM, a semiconductor memory, or the like. Also, this computer program may be distributed to the computer on a communication circuit, and the computer that receives this distribution may execute the program.

Also, the program as described above may realize some of the functions described above. In addition, the functions as described above may be realized in combination with a program already stored on the computer system, namely, a so-called differential file (differential program).

In addition, the constituent elements in the embodiments as described above can be replaced as appropriate with commonly known constituent elements, to the extent that it does not depart from the intention of the present invention. Also, the technical scope of the present invention is not limited to the embodiments described above, and various modifications may be further made without departing from the spirit of the present invention.

INDUSTRIAL APPLICABILITY

The present invention may be applied to a fuel control device, a combustor, a gas turbine, a control method, and a program.

REFERENCE SIGNS LIST

10 Gas turbine
11 Air compressor

12 Combustor
13 Turbine
14 IGV
15 Rotor
16 Generator
17 Power meter
18 Pilot system fuel flow rate regulating valve (first adjustment valve)
19 Main system fuel flow rate regulating valve (second adjustment valve)
20 Top hat system fuel flow rate regulating valve (third adjustment valve)
21 Fuel supply device
22 Pressure gage
23 Thermometer
25 Arm
26 Link mechanism
27 Annular member
28 Actuator
50 Control device
51 Gas turbine output prediction value calculation unit
510 IGV response correction unit
52 Turbine inlet temperature estimation unit
53 Fuel distribution command value calculation unit
54 Total fuel flow rate calculation unit
55 Valve opening calculation unit
56 Gas turbine output correction amount calculation unit
57 Load change rate calculation unit
58 Coefficient calculation unit
59 Load change rate determination unit
61 Gas turbine output calculation unit
62 Load change mode calculation unit
63 Load change mode determination unit

The invention claimed is:

1. A fuel control device comprising:
an inlet guide vane (IGV) response correction unit configured to receive IGV opening command values from an IGV control device, the IGV opening command value for setting an opening degree of a plurality of IGVs, wherein the opening degree of the plurality of IGVs controls an amount of in-flowing air;
the IGV response correction unit further configured to calculate an actual opening equivalent value that indicates an approximate value of an actual opening degree of the plurality of IGVs during a transition of an IGV opening degree due to a response delay occurring between a time of an IGV opening command value indicating a predetermined IGV opening degree and a time at which the IGV opening degree reaches the predetermined IGV opening degree indicated by the IGV opening command value;
a combustion temperature estimation value calculation unit configured to calculate a temperature estimation value when a mixture of a fuel and the in-flowing air is combusted, using the actual opening equivalent value, atmospheric conditions, and a gas turbine output;
a fuel distribution command value calculation unit configured to calculate and output, based on the temperature estimation value, a fuel distribution command value that indicates a distribution of a fuel output from a plurality of fuel supply systems;
a valve opening calculation unit configured to acquire the fuel distribution command value and a fuel control signal command value that indicates a total fuel flow rate to be output to the plurality of fuel supply systems, and to calculate respective valve openings of fuel flow rate regulating valves of the plurality of fuel supply systems based on the fuel distribution command value and the fuel control signal command value; and
wherein the fuel control device is configured to control the fuel flow rate regulating valves of the plurality of fuel supply systems based on the calculated respective valve openings.

2. The fuel control device according to claim 1, wherein the IGV response correction unit calculates the actual opening equivalent value based on a correlation that is prescribed in advance between the time of the IGV opening command value indicating the predetermined IGV opening degree and the time at which the IGV opening degree reaches the predetermined IGV opening degree indicated by the IGV opening command value.

3. The fuel control device according to claim 1, further comprising:
a gas turbine output prediction value calculation unit configured to calculate a gas turbine output prediction value based on a correlation that is prescribed in advance between the fuel control signal command value and a gas turbine output correction amount.

4. The fuel control device according to claim 3, further comprising:
a gas turbine output correction amount calculation unit configured to calculate the gas turbine output correction amount that corrects the gas turbine output prediction value based on a correlation that is prescribed in advance between the fuel control signal command value and a value that corrects the gas turbine output; and
the gas turbine output prediction value calculation unit configured to calculate the gas turbine output prediction value using each of an actual measured value of the gas turbine output and the gas turbine output correction amount.

5. The fuel control device according to claim 4, further comprising:
a coefficient calculation unit configured to calculate a weighting coefficient corresponding to the gas turbine output correction amount, in accordance with a value indicating changes in the gas turbine output per unit time, wherein
the gas turbine output prediction value calculation unit calculates the gas turbine output prediction value using each of the actual measured value of the gas turbine output and a value obtained by multiplying the gas turbine output correction amount by the weighting coefficient.

6. The fuel control device according to claim 4, further comprising:
a load change rate determination unit configured to detect changes in the gas turbine output per unit time and to set the gas turbine output correction amount to zero when the changes in the gas turbine output are smaller than a predetermined value.

7. The fuel control device according to claim 4, further comprising:
a coefficient calculation unit configured to calculate a weighting coefficient corresponding to the gas turbine output correction amount; in accordance with a value indicating the gas turbine output.

8. The fuel control device according to claim 4, further comprising:
a switching unit configured to switch weighting coefficients, based on a plurality of weighting coefficients corresponding to at least two gas turbine load change modes prescribed in advance in accordance with load changes of a gas turbine per unit time wherein
the gas turbine output prediction value calculation unit calculates the gas turbine output prediction value using the actual measured value of the gas turbine output and a value obtained by multiplying the gas turbine output correction amount by a respective weighting coefficient of the plurality of weighting coefficients.

9. A combustor comprising the fuel control device according to claim 1.

10. A gas turbine comprising the fuel control device according to claim 1.

11. A control method comprising:
transitioning an inlet guide vane (IGV) to achieve a predetermined IGV opening degree indicated by an IGV opening command value, wherein the IGV controls an amount of in-flowing air;
calculating an actual opening equivalent value that indicates an approximate value of an actual opening degree of the IGV during the transition of an IGV opening degree due to a response delay occurring between a time of the IGV opening command value indicating the predetermined IGV opening degree and a time at which the IGV opening degree reaches the predetermined IGV opening degree indicated by the IGV opening command value;
calculating a temperature estimation value when a mixture of a fuel and the in-flowing air is combusted, using the actual opening equivalent value, atmospheric conditions, and a gas turbine output;
calculating and outputting, based on the temperature estimation value, a fuel distribution command value that indicates a distribution of a fuel output from a plurality of fuel supply systems; and
acquiring the fuel distribution command value and a fuel control signal command value that indicates a total fuel flow rate to be output to the plurality of fuel supply systems, and calculating respective valve openings of fuel flow rate regulating valves of the plurality of fuel supply systems based on the fuel distribution command value and the fuel control signal command value.

12. A non-transitory computer-readable recording medium having instructions stored therein which, when executed by a computer of a fuel control device, cause the fuel control device to:
calculate an actual opening equivalent value that indicates an approximate value of an actual opening degree of an inlet guide vane (IGV) during a transition of an IGV opening degree due to a response delay occurring between a time of an IGV opening command value indicating a predetermined IGV opening degree and a time at which the IGV opening degree reaches the predetermined IGV opening degree indicated by the IGV opening command value;
calculate a temperature estimation value when a mixture of a fuel and an in-flowing air is combusted, wherein the temperature estimation value is calculated using the actual opening equivalent value, atmospheric conditions, and a gas turbine output;
acquire a fuel distribution command value and a fuel control signal command value, the fuel distribution command value indicating a distribution of a fuel output from a plurality of fuel supply systems and the fuel control signal command value indicating a total fuel flow rate to be output to the plurality of fuel supply systems, wherein the fuel distribution command value is calculated based upon the temperature estimation value;
calculate respective valve openings of fuel flow rate regulating valves of the plurality of fuel supply systems based on the fuel distribution command value and the fuel control signal command value; and
control the valve openings of fuel flow rate regulating valves based on the calculated respective valve openings of the fuel flow rate regulating valves of the plurality of fuel supply systems.

* * * * *